United States Patent
Nagano et al.

(10) Patent No.: US 10,672,187 B2
(45) Date of Patent: Jun. 2, 2020

(54) INFORMATION PROCESSING APPARATUS AND INFORMATION PROCESSING METHOD FOR DISPLAYING VIRTUAL OBJECTS IN A VIRTUAL SPACE CORRESPONDING TO REAL OBJECTS

(71) Applicant: SONY CORPORATION, Tokyo (JP)

(72) Inventors: Kae Nagano, Tokyo (JP); Tomohiro Ishii, Tokyo (JP); Nobuaki Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 15/551,144

(22) PCT Filed: Jan. 13, 2016

(86) PCT No.: PCT/JP2016/050837
§ 371 (c)(1),
(2) Date: Aug. 15, 2017

(87) PCT Pub. No.: WO2016/136311
PCT Pub. Date: Sep. 1, 2016

(65) Prior Publication Data
US 2018/0033195 A1    Feb. 1, 2018

(30) Foreign Application Priority Data

Feb. 27, 2015    (JP) .................. 2015-039549

(51) Int. Cl.
*G06T 17/20*    (2006.01)
*G06F 3/0487*    (2013.01)
(Continued)

(52) U.S. Cl.
CPC ............ *G06T 17/20* (2013.01); *G06F 3/0325* (2013.01); *G06F 3/0346* (2013.01);
(Continued)

(58) Field of Classification Search
None
See application file for complete search history.

(56) References Cited

U.S. PATENT DOCUMENTS 5,745,387 A * 4/1998 Corby, Jr. .............. B25J 9/1671
                                                        348/114
8,549,418 B2 * 10/2013 Lamarca ............. G06F 3/04883
                                                        353/28
(Continued)

FOREIGN PATENT DOCUMENTS

CN    101059717 A    10/2007
EP    1847912 A2    10/2007
(Continued)

OTHER PUBLICATIONS

Kawamura et al "A Design of State Acquisition Function using Range Image Sensor for 3D Symbiotic Space", 2013 IEEE Eighth Intl. Conf. on Broadband, Wireless Computing, Communication and Applications, 2013. (Year: 2013).*

(Continued)

*Primary Examiner* — Kee M Tung
*Assistant Examiner* — Patrick F Valdez
(74) *Attorney, Agent, or Firm* — Chip Law Group

(57) ABSTRACT

An information processing apparatus including a generation unit that generates display control information for displaying a virtual space based on first operation information detected about a first real object corresponding to a virtual object in the virtual space and second operation information detected about a second real object corresponding to a virtual tool in the virtual space.

20 Claims, 19 Drawing Sheets

(51) Int. Cl.
*G06T 19/20* (2011.01)
*G06F 3/042* (2006.01)
*G06F 3/0484* (2013.01)
*G06F 3/03* (2006.01)
*G06F 3/0346* (2013.01)
*G06F 3/0481* (2013.01)

(52) U.S. Cl.
CPC .......... *G06F 3/0425* (2013.01); *G06F 3/0481* (2013.01); *G06F 3/0487* (2013.01); *G06F 3/04845* (2013.01); *G06T 19/20* (2013.01); *G06T 2219/2004* (2013.01); *G06T 2219/2012* (2013.01)

(56) References Cited

U.S. PATENT DOCUMENTS

| | | | |
|---|---|---|---|
| 10,168,873 B1* | 1/2019 | Holz | G06F 3/04842 |
| 2002/0044153 A1* | 4/2002 | Hoch | H04N 5/222 |
| | | | 345/647 |
| 2002/0197591 A1* | 12/2002 | Ebersole | A62C 99/0081 |
| | | | 434/226 |
| 2007/0038944 A1* | 2/2007 | Carignano | G06T 15/20 |
| | | | 715/757 |
| 2007/0242066 A1* | 10/2007 | Levy Rosenthal | H04N 5/272 |
| | | | 345/419 |
| 2007/0247393 A1 | 10/2007 | Kuroki et al. | |
| 2011/0195783 A1* | 8/2011 | Miyazaki | G06F 3/0346 |
| | | | 463/37 |
| 2011/0304651 A1* | 12/2011 | Shimura | G06F 3/03545 |
| | | | 345/661 |
| 2011/0306413 A1* | 12/2011 | Bickerstaff | G06F 3/0304 |
| | | | 463/31 |
| 2012/0013613 A1* | 1/2012 | Vesely | G06F 3/011 |
| | | | 345/419 |
| 2012/0256956 A1* | 10/2012 | Kasahara | G06F 3/04815 |
| | | | 345/633 |
| 2013/0083067 A1* | 4/2013 | Kuroki | G06F 3/016 |
| | | | 345/633 |
| 2013/0120451 A1* | 5/2013 | Sasaki | G06T 5/50 |
| | | | 345/633 |
| 2014/0232816 A1* | 8/2014 | Wilson | H04N 7/157 |
| | | | 348/14.08 |

FOREIGN PATENT DOCUMENTS

| | | |
|---|---|---|
| JP | 2007-293413 A | 11/2007 |
| JP | 2014-109802 A | 6/2014 |
| JP | 2014-164003 A | 9/2014 |
| JP | 2014164003 A * | 9/2014 |

OTHER PUBLICATIONS

International Search Report and Written Opinion of PCT Application No. PCT/JP2016/050837, dated Feb. 16, 2016, 01 pages of English Translation and 05 pages of ISRWO.

* cited by examiner

FIG. 9
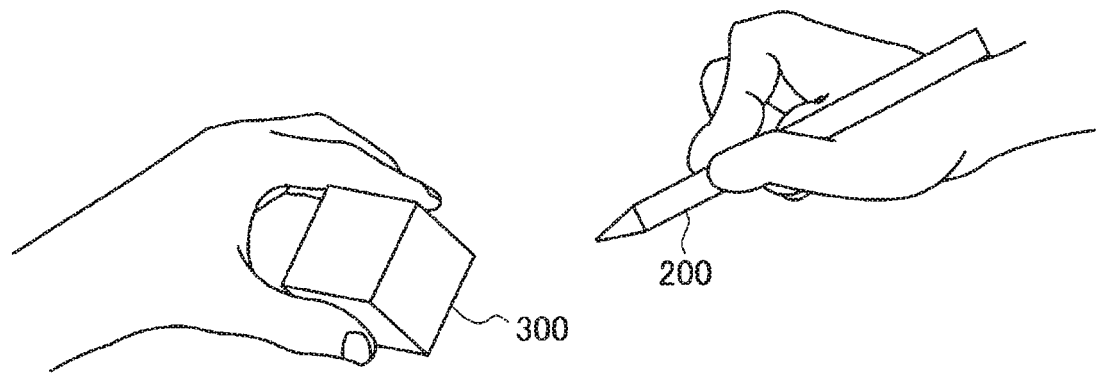
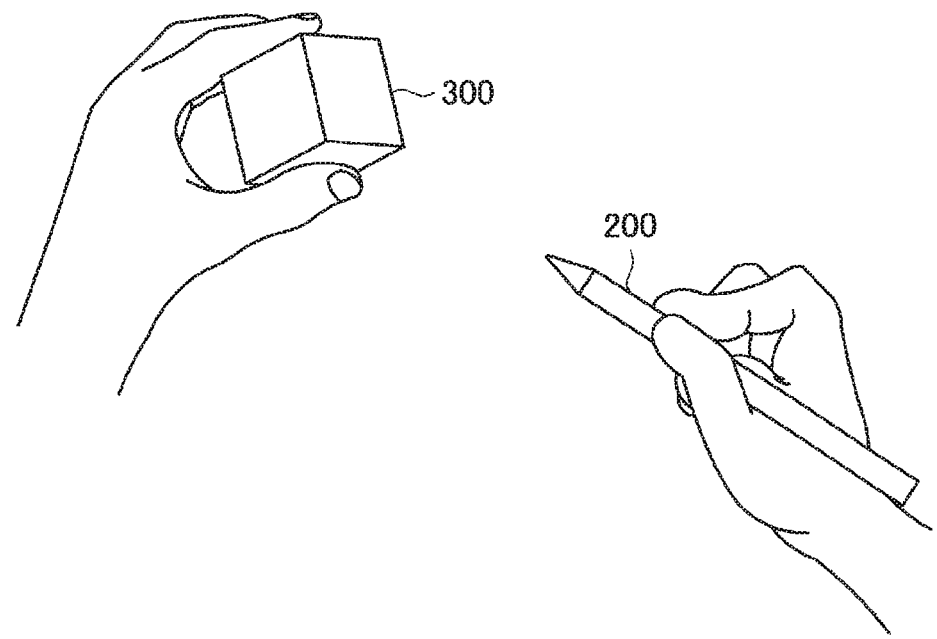

FIG. 17
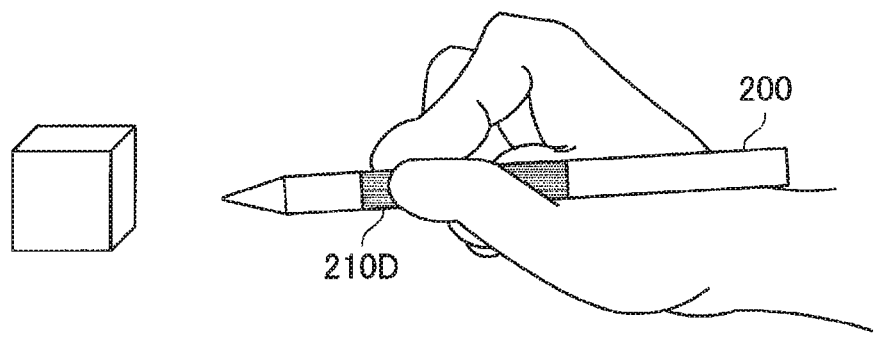
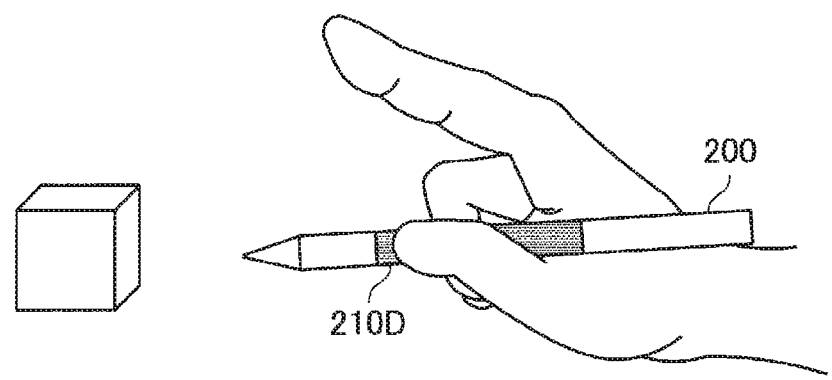

FIG. 18
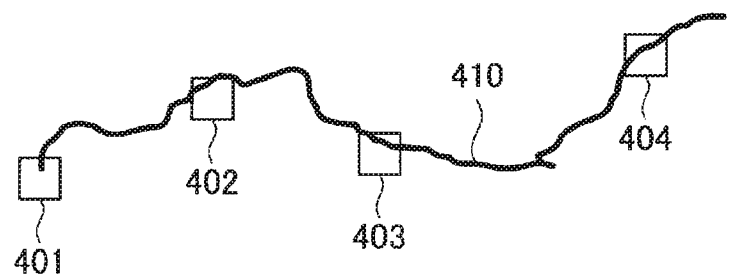
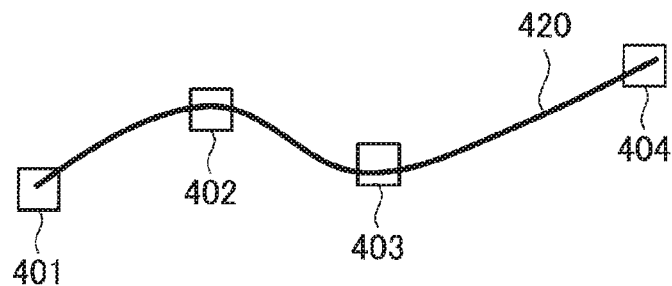

INFORMATION PROCESSING APPARATUS AND INFORMATION PROCESSING METHOD FOR DISPLAYING VIRTUAL OBJECTS IN A VIRTUAL SPACE CORRESPONDING TO REAL OBJECTS

CROSS REFERENCE TO RELATED APPLICATIONS

This application is a U.S. National Phase of International Patent Application No. PCT/JP2016/050837 filed on Jan. 13, 2016, which claims priority benefit of Japanese Patent Application No. JP 2015-039549 filed in the Japan Patent Office on Feb. 27, 2015. Each of the above-referenced applications is hereby incorporated herein by reference in its entirety.

TECHNICAL FIELD

The present disclosure relates to an information processing apparatus, an information processing method, and a program.

BACKGROUND ART

In recent years, three-dimensional computer graphics (3DCG) is used in various fields. A user can generate 3DCG in a virtual space and appreciate the virtual space from an arbitrary viewpoint by operating a 3DCG application. In this case, the user is required to perform complicated operations, such as identifying a position in the virtual space with three coordinates of X coordinate, Y coordinate, and Z coordinate, and designating various parameters. Therefore, such a technology is developed that improves an operational environment of the 3DCG application.

For example, in the following Patent Literature 1, such a technology is disclosed that determines the position of a viewpoint defined in the virtual space according to the posture of a device in a real space.

CITATION LIST

Patent Literature

Patent Literature 1: JP2014-109802A

DISCLOSURE OF INVENTION

Technical Problem

However, in the Patent Literature 1, with the posture of the device in the real space, only the viewpoint in the virtual space can be operated. In the virtual space, there is a virtual object in addition to a working point as an operation target of a user, such as a viewpoint. Preferably, the virtual object can also be operated with an intuitive operation in the real space. Accordingly, in the present disclosure, a novel and improved information processing apparatus, information processing method, and program are proposed capable of providing a more intuitive operational environment of 3DCG application.

Solution to Problem

According to the present disclosure, there is provided an information processing apparatus including: a generation unit configured to generate display control information for displaying a virtual space on a basis of first operation information detected about a first real object corresponding to a virtual object in the virtual space and second operation information detected about a second real object corresponding to a virtual tool in the virtual space.

Further, according to the present disclosure, there is provided an information processing method executed by a processor, including: generating display control information for displaying a virtual space on a basis of first operation information detected about a first real object corresponding to a virtual object in the virtual space and second operation information detected about a second real object corresponding to a virtual tool in the virtual space.

Further, according to the present disclosure, there is provided a program causing a computer to function as: a generation unit configured to generate display control information for displaying a virtual space on a basis of first operation information detected about a first real object corresponding to a virtual object in the virtual space and second operation information detected about a second real object corresponding to a virtual tool in the virtual space.

Advantageous Effects of Invention

As mentioned above, according to the present disclosure, it is possible to provide a more intuitive operational environment of 3DCG application. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram for explaining an outline of the information processing apparatus according to the present embodiment.

FIG. 17 is a diagram for explaining an example of a camera shake correction function according to the present embodiment.

FIG. 18 is a diagram for explaining an example of a camera shake correction function according to the present embodiment.

MODE(S) FOR CARRYING OUT THE INVENTION

Figure 1:
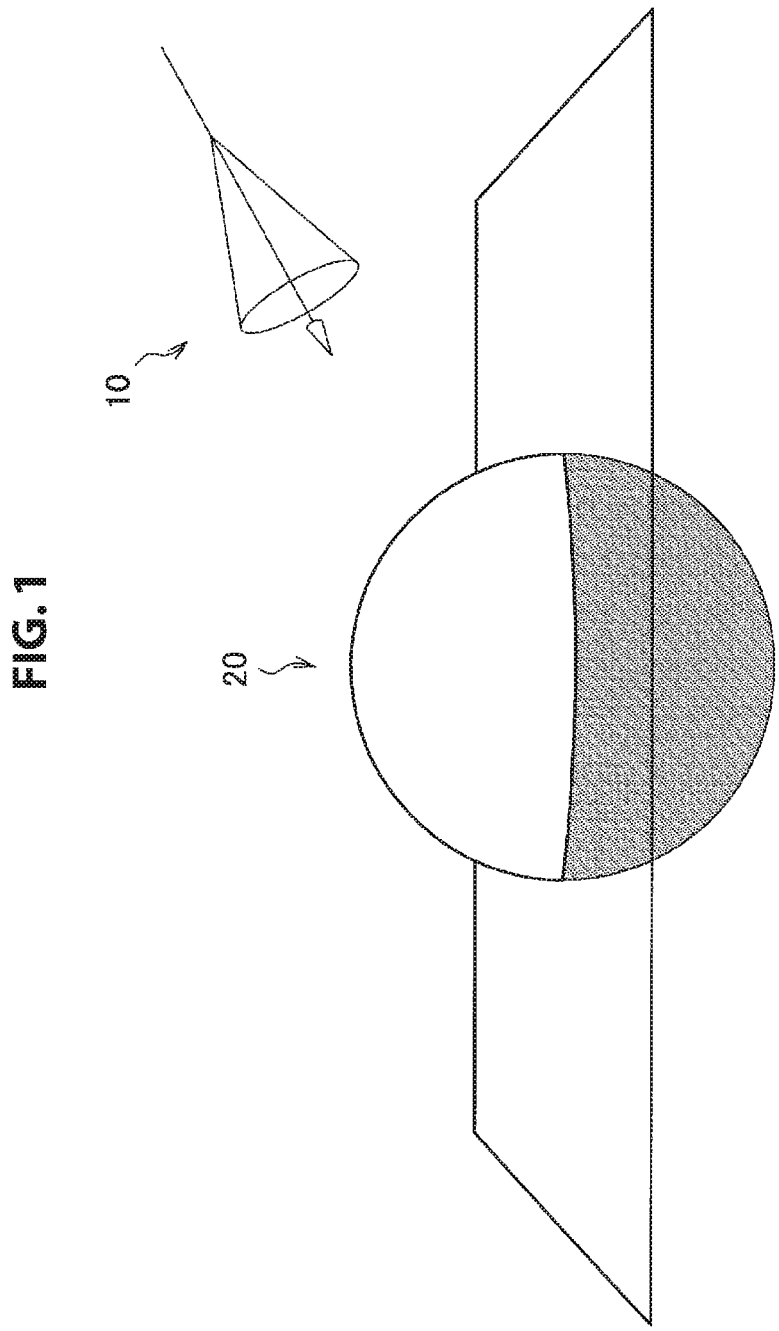
FIG. 1 is a diagram for explaining an operational environment in a 3DCG application.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Further, there is a case in which elements having substantially the same function are discriminated by affixing different alphabets to the back of the same sign in the present specification and figures. For example, elements having substantially the same functional configuration are discriminated as information processing apparatuses 100A, 100B and 100C as necessary. However, when there is no need to particularly discriminate a plurality of elements having substantially the same functional configuration, only the same sign is affixed. For example, when there is no need to particularly discriminate the information processing apparatuses 100A, 100B and 100C, they are simply referred to as an information processing apparatus 100.

Note that a description will be given in the following order.
1. Outline
  1.1. Introduction
  1.2. Technical problems
2. Configuration example
  2.1. Appearance configuration example
  2.2. Functional configuration example
3. First embodiment
  3.1. Technical features
  3.2. Operation processing example
4. Second embodiment
  4.1. Technical features
  4.2. Operation processing example
5. Third embodiment
  5.1. Technical features
  5.2. Operation processing example
6. Fourth embodiment
7. Fifth embodiment
8. Example of hardware configuration
9. Conclusion 1. Outline <1.1. Introduction>

Figure 2:
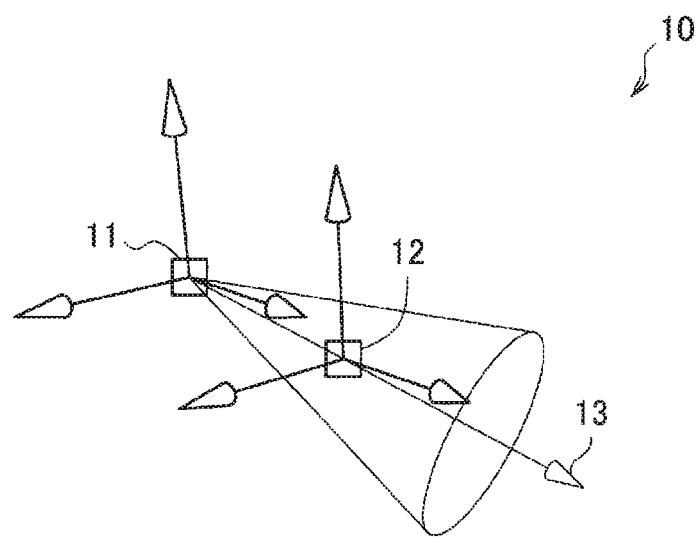
FIG. 2 is a diagram for explaining an operational environment in a 3DCG application.

First, a description will be given of an operational environment in a 3DCG application with reference to FIGS. 1 and 2. FIGS. 1 and 2 are diagrams for explaining the operational environment in the 3DCG application.

FIG. 1 shows an example of a virtual space of the 3DCG application. The user can provide the virtual space with various workings by operating a manipulator 10. The manipulator 10 has the directivity, and can provide a working to the direction of the manipulator 10. Further, the manipulator 10 can function as a virtual tool. For example, in the example shown in FIG. 1, the manipulator 10 is a manipulator for light that functions as a light, and can irradiate a virtual object 20 with spotlight from the position of the manipulator 10. The user can provide the virtual space with various workings, such as movement, deformation, or coloring of the virtual object 20 by using various kinds of manipulators, such as a manipulator for movement, a manipulator for deformation, or a manipulator for coloring in addition to the manipulator for light.

As shown in FIG. 2, a direction 13 of the manipulator 10 is identified by an origin 11 and a look-at point 12. Therefore, the user designates coordinates (X coordinate, Y coordinate, and Z coordinate) of each of the origin 11 and the look-at point 12 in order to operate the direction 13 of the manipulator 10.

<1.2. Technical Problems>

Herein, in a case where the user performs an operation with a mouse or a keyboard, it was hard to simultaneously operate the origin 11 and the look-at point 12. Further, in order to operate the origin 11 and the look-at point 12, three coordinates of X coordinate, Y coordinate, and Z coordinate need to be designated, respectively. Therefore, an operation for controlling the direction 13 of the manipulator 10 was cumbersome.

Further, regarding the virtual object 20, the user, for example, performed operations, such as moving the virtual object 20 via the manipulator for movement. Therefore, operating the virtual object 20 may be also cumbersome, similarly to the manipulator 10. Further, it was hard to individually and simultaneously operate the manipulator 10 and the virtual object 20, such as causing the manipulator 10 to function as a virtual tool, such as a light, to operate the position and direction of the virtual object 20 while operating the position and direction of the light.

Accordingly, with the situations as a viewpoint, an information processing system according to an embodiment of the present disclosure was devised. With the information processing system according to the present embodiment, it is possible to provide a more intuitive operational environment of 3DCG application.

2. Configuration Example

Hereinbelow, a description will be given of a configuration example of the information processing system common to the respective embodiments with reference to FIGS. 3 to 5.

<2.1. Appearance Configuration Example>

Figure 3:
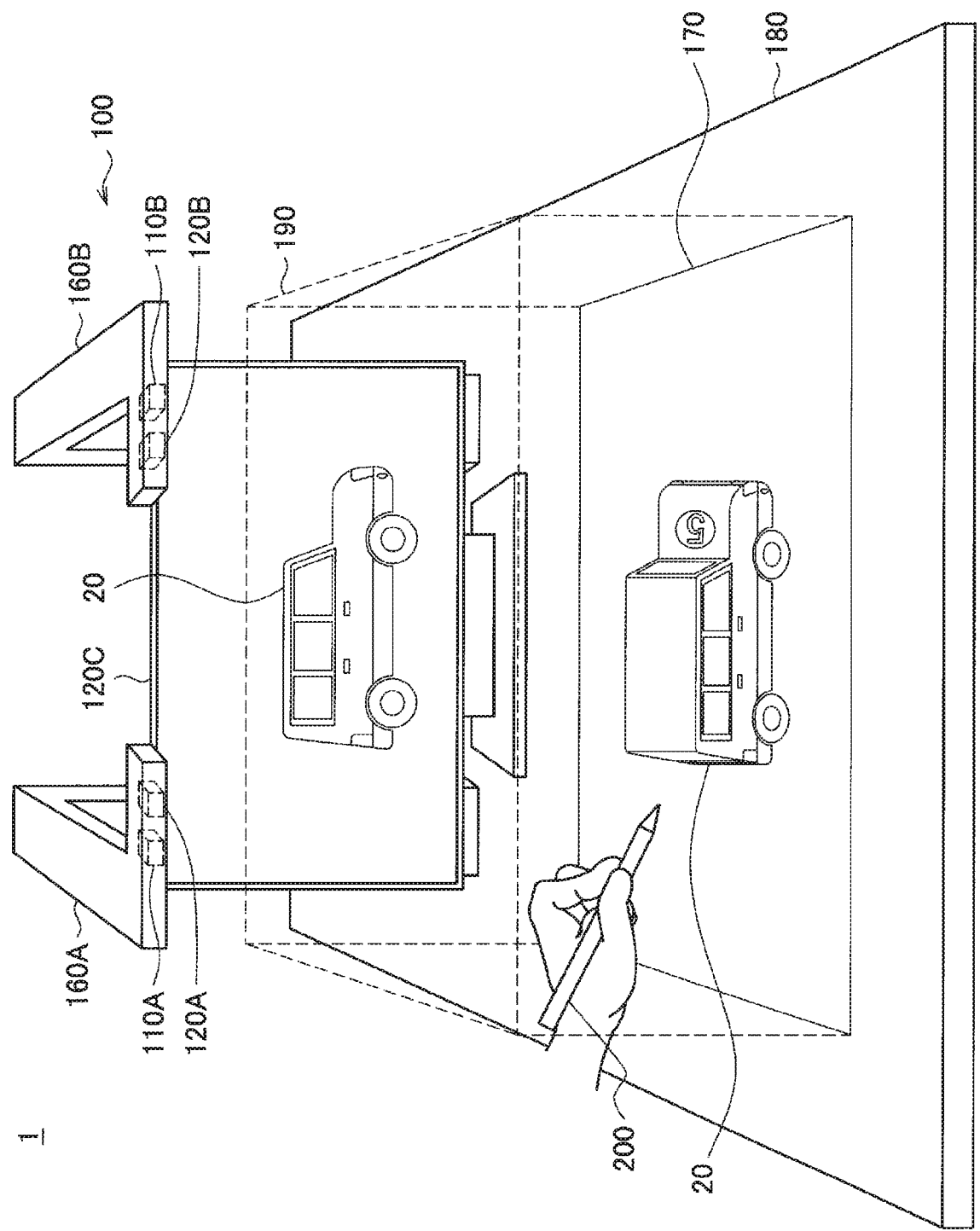
FIG. 3 is a diagram showing an example of an appearance configuration of an information processing system according to the present embodiment.

FIG. 3 is a diagram showing an example of appearance configuration of the information processing system 1 according to the present embodiment. As shown in FIG. 3, the information processing system 1 includes an information processing apparatus 100 and a pen 200 for operation.

The information processing apparatus 100 includes one or more movable arms 160. Arms 160A and 160B have sensor units 110A and 110B and display units 120A and 120B, respectively. The sensor units 110A and 110B each include an image sensor that can capture an image (still image/moving image) and a depth sensor that can obtain depth information (distance in a depth direction), and can detect a state of a recognition range 190 on a table 180. The image sensor may be realized by, for example, an RGB camera, and the depth sensor may be realized by, for example, an IR (infrared) stereo camera.

The display units 120A and 120B are realized by, for example, projectors, and project images to a projection surface 170. The projected image is, for example, an operation screen of the 3DCG application. The projection surface 170 may have a function as a touch panel, and may sense the touch with the pen 200 for operation. The projectors 120A and 120B project the same image to the projection surface 170 while matching projection positions with each other. Since a plurality of projection light beams is irradiated from different positions, even if there is an obstacle, such as a user's hand, existing on the projection surface 170, shadow made by the obstacle, such as a user's hand, existing on the projection surface 170 is light. Therefore, it is possible to improve the visibility of an image on the projection surface at the position of shadow.

The information processing apparatus 100 may further include a display unit 120C. The display unit 120C is realized by, for example, a display to display an image. The displayed image is, for example, an operation screen of the 3DCG application. The projectors 120A and 120B and the display 120C may display different images, or display the same image. For example, in the example shown in FIG. 3, displayed is a state of a virtual object 20 of a vehicle viewed at an angle different from that of the projectors 120A and 120B and the display 120C.

The pen 200 for operation is a device operated by the user. As shown in FIG. 3, the pen 200 for operation may be gripped by the user's hand, be placed on the projection surface 170, or be supported by any supporter, such as a tripod. Hereinbelow, a specific description will be given of an appearance configuration example of the pen 200 for operation with reference to FIG. 4.

Figure 4:
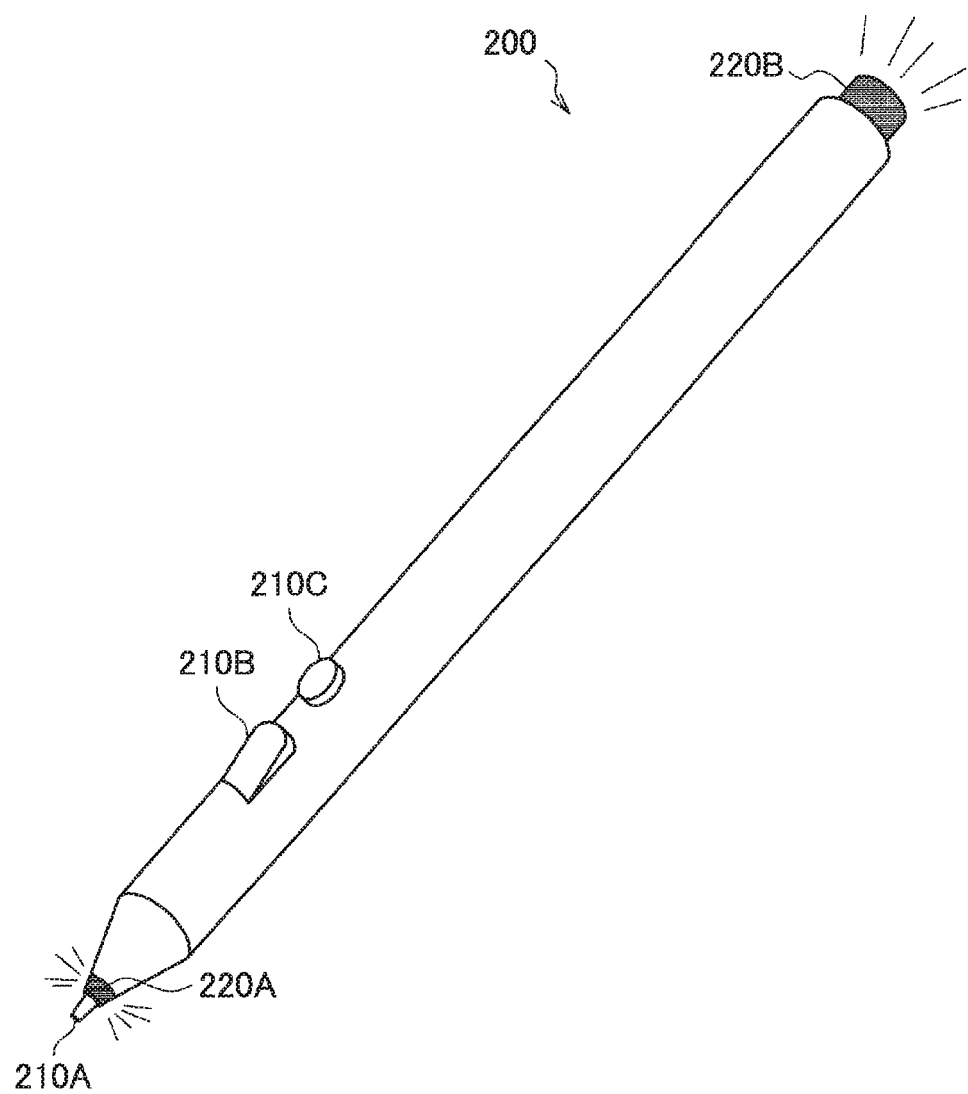
FIG. 4 is a diagram showing an example of an appearance configuration of a pen for operation according to the present embodiment.

FIG. 4 is a diagram showing an example of appearance configuration of the pen 200 for operation according to the present embodiment. As shown in FIG. 4, a plurality of input units 210 and a plurality of light emitting units 220 are provided to the pen 200 for operation.

The input unit 210 has a function for receiving a user input. In the example shown in FIG. 4, the input unit 210 is a button. For example, a button 210A corresponds to left click of the mouse. A button 210B corresponds to right click of the mouse. A button 210C is a general-purpose button to which an arbitrary function is allocated. In addition, the input unit 210 may be realized by a touch sensor, a toggle, a slider, or the like.

The light emitting unit 220 has a function for emitting light. For example, the light emitting unit 220 is realized by a light emitting diode (LED), an IR LED, or the like. The light emitting unit 220 emits light, thereby facilitating detection of the posture of the pen 200 for operation by the sensor unit 110, as compared with a case of emitting no light. Note that, in order to facilitate detection of the posture of the pen 200 for operation, in place of or together with the light emitting unit 220, a passive marker, such as a barcode, may be attached to the pen 200 for operation.

In addition, the pen 200 for operation may have an inertial sensor such as an acceleration sensor and a gyroscope sensor, a speed sensor, a vibration sensor, or a living-body sensor. Further, the pen 200 for operation may have a communication unit capable of wireless communication by using an arbitrary communication system, such as a wireless local area network (LAN), a Wi-Fi (registered trademark), or Bluetooth (registered trademark), and further may transmit and receive various data to/from the information processing apparatus 100.

The user touches, or moves while touching the operation screen of the 3DCG application projected on the projection surface 170 or displayed on the display unit 120 with the pen 200 for operation, thereby intuitively operating the 3DCG application. Further, the user operates the pen 200 for operation in the recognition range 190, thereby intuitively operating the 3DCG application according to the position and posture of the pen 200 for operation.

The description has been given above of the appearance configuration example of the pen 200 for operation. Subsequently, a description will be given of a functional configuration example of the information processing apparatus 100 with reference to FIG. 5.

<2.2. Functional Configuration Example>

Figure 5:
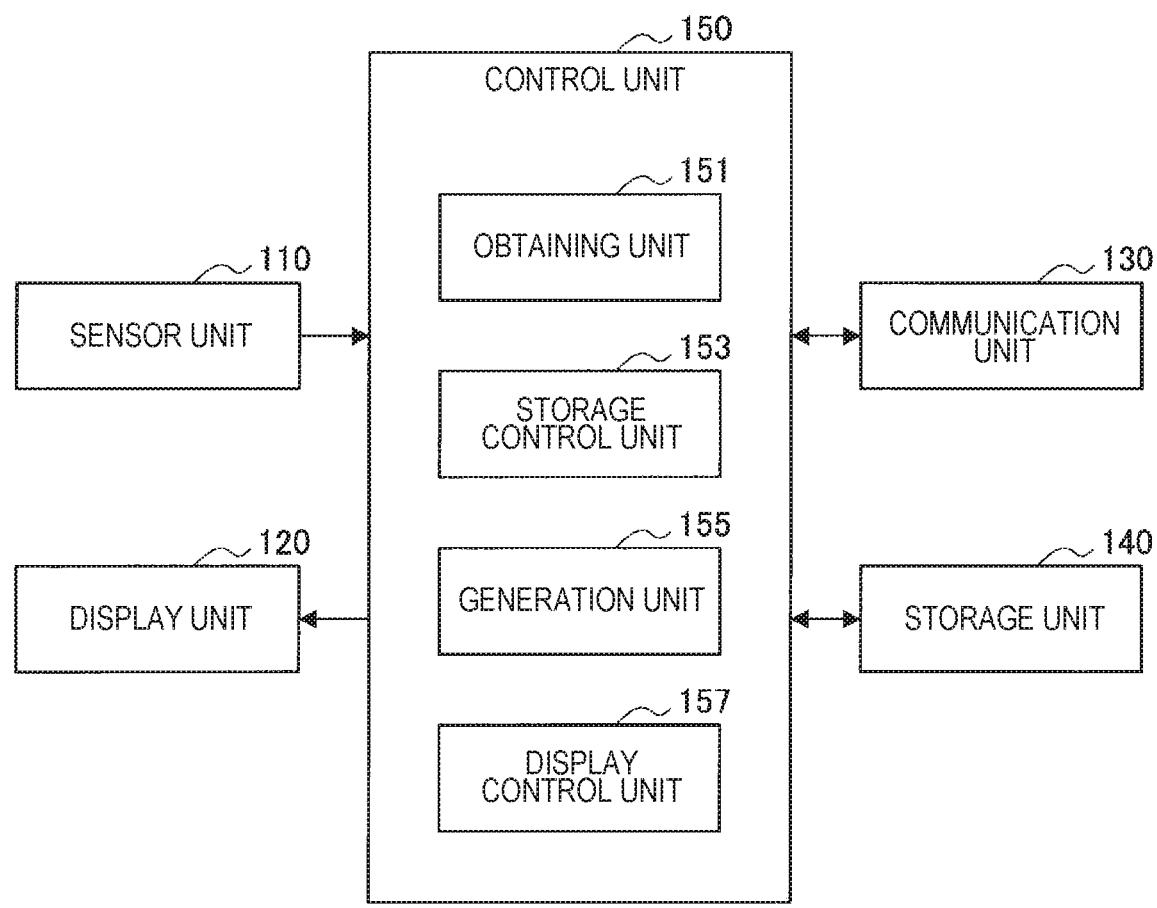
FIG. 5 is a block diagram showing an example of a logical configuration of an information processing apparatus according to the present embodiment.

FIG. 5 is a block diagram showing an example of a logical configuration of the information processing apparatus 100 according to the present embodiment. As shown in FIG. 5, the information processing apparatus 100 includes a sensor unit 110, a display unit 120, a communication unit 130, a storage unit 140 and a control unit 150.

The sensor unit 110 has a function for detecting a state of the recognition range 190. As mentioned above, the sensor unit 110 includes, for example, the image sensor and the depth sensor, and detects image information and depth information about a real object, such as the pen 200 for operation, existing in the recognition range 190. The sensor unit 110 outputs the detected information to the control unit 150.

The display unit 120 has a function for displaying information. As mentioned above, the display unit 120 can be realized by the projector and display. The display unit 120 outputs an operation screen or the like of the 3DCG application under the control of the control unit 150.

The communication unit 130 is a communication module for transmitting and receiving data to/from external equipment in a wired/wireless manner. The communication unit 130 communicates with the pen 200 for operation by using an arbitrary communication system such as the wireless LAN, Wi-Fi, or Bluetooth. For example, the communication unit 130 can receive input information to the input unit 210 or information detected by an inertial sensor included in the pen 200 for operation. The communication unit 130 outputs the received information to the control unit 150.

The storage unit 140 is a part for recording and reproducing data to a predetermined recording medium. For example, the storage unit 140 stores information indicating operation contents on the basis of a storing instruction from the user.

The control unit 150 functions as an arithmetic processing device and a control device, and controls all operations in the information processing apparatus 100 according to various programs. As shown in FIG. 5, the control unit 150 functions as an obtaining unit 151, a storage control unit 153, a generation unit 155, and a display control unit 157. The obtaining unit 151 has a function for obtaining operation information indicating the operation contents of the user. The storage control unit 153 has a function for storing information to the storage unit 140 or reading information stored in the storage unit 140. The generation unit 155 has a function for generating display control information that prescribes contents to be displayed on the display unit 120. Note that the display control information may be a signal for displaying an image, such as an RGB signal or HDMI (registered trademark) signal, or an HTML file. The display control unit 157 has a function for controlling the display unit 120 so as to perform display based on the display control information generated by the generation unit 155.

Note that the information processing apparatus 100 obtains coordinates from the 3DCG application, and performs various kinds of information processing on the basis of the obtained coordinates. Communication, such as an input and an output of coordinates, performed between the control unit 150 and the 3DCG application may be performed by API, plug-in of the 3DCG application, or the like.

The description has been given above of a functional configuration example of the information processing apparatus 100 according to the present embodiment. Subsequently, a specific description will be given of respective embodiments.

3. First Embodiment

First, a description will be given of the outline of the information processing apparatus 100 according to the present embodiment with reference to FIG. 6.

Figure 6:
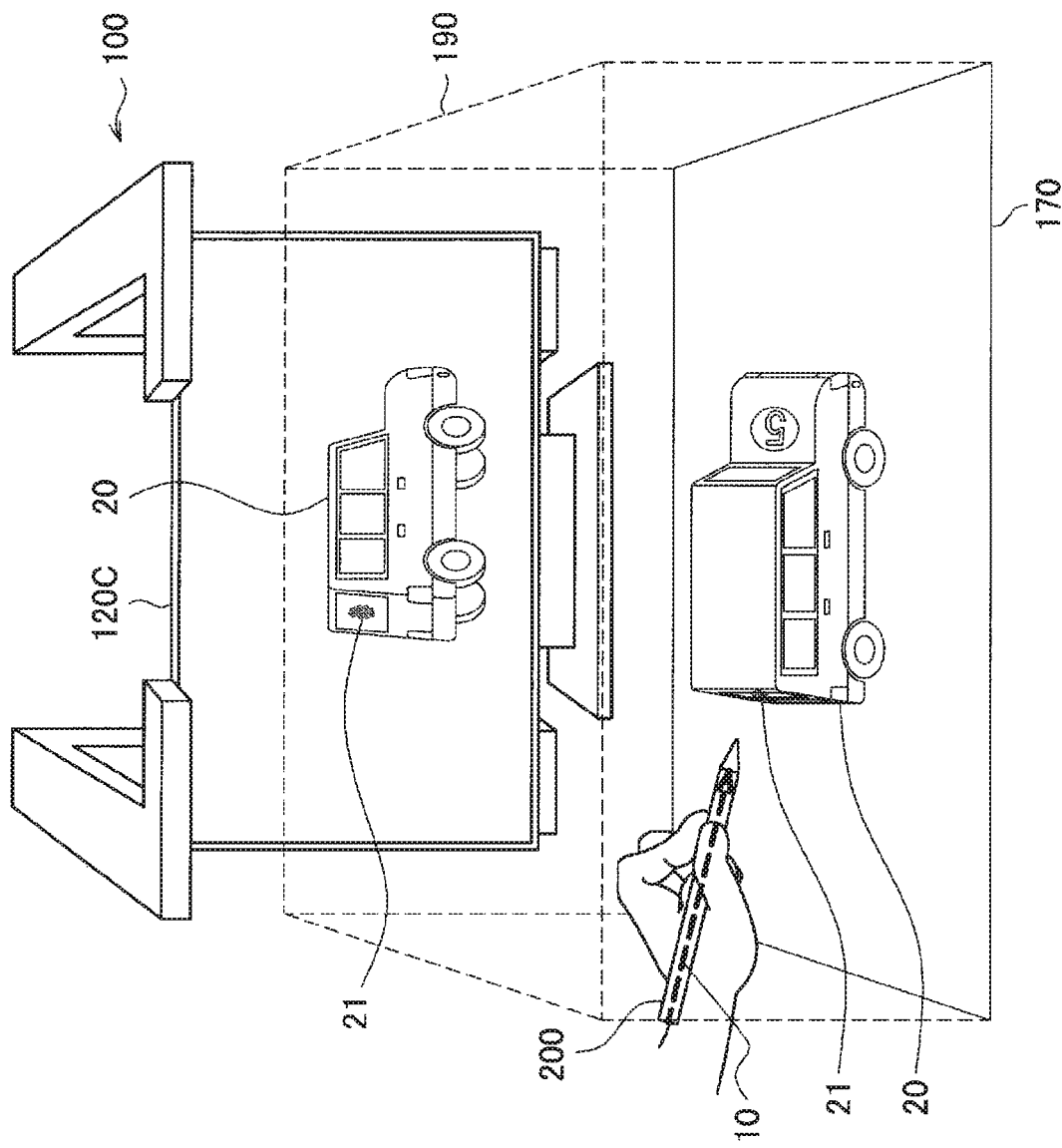
FIG. 6 is a diagram for explaining an outline of the information processing apparatus according to the present embodiment.

FIG. 6 is a diagram for explaining the outline of the information processing apparatus 100 according to the present embodiment. As shown in FIG. 6, the user operates the pen 200 for operation in the recognition range 190. Further, a state of the virtual object 20 of vehicle viewed from the side back is displayed on the display 120C. A state of the virtual object 20 of vehicle viewed from above is displayed on the projection surface 170. The present embodiment is a form in which the position and posture of the pen 200 for operation in the recognition range 190 is reflected in the position and posture of the manipulator 10.

Hereinbelow, a description will be given of technical features of the information processing apparatus 100 according to the present embodiment.

<3.1. Technical Features>

(Operation Information Obtaining Function)

The information processing apparatus 100 (for example, the obtaining unit 151) has a function for obtaining operation information indicating operation contents of the user. The operation information in the present embodiment includes information indicating the position and posture in the real space of the real object operated by the user of the pen 200 for operation, or the like.

For example, the obtaining unit 151 may obtain the position and posture of the pen 200 for operation by recognizing an image of the pen 200 for operation from the image information detected by the sensor unit 110 or recognizing the height of the pen 200 for operation from the depth information detected by the sensor unit 110. In this case, the obtaining unit 151 may obtain the position and posture of the pen 200 for operation by identifying the coordinates of both ends (light emitting units 220A and 220B) of the pen 200 for operation.

Further, the obtaining unit 151 may obtain the posture of the pen 200 for operation from the information detected by a sensor included in the pen 200 for operation and received by the communication unit 130. For example, the obtaining unit 151 obtains the posture of the pen 200 for operation from a detection result of gravity acceleration.

In addition, the obtaining unit 151 can obtain input information to the input unit 210 of the pen 200 for operation received by the communication unit 130 or information, such as acceleration or speed, detected by the sensor included in the pen 200 for operation as the operation information.

Further, for example, another real object, such as a user's finger, may function as the pen 200 for operation. In this case, the operation information is information indicating the finger and posture of the user. The obtaining unit 151 can obtain operation information by identifying the coordinates of the root and the tip of the user's finger, similarly to both ends of the pen 200 for operation.

(Coordinate Converting Function)

The information processing apparatus 100 (for example, the generation unit 155) has a function for converting the coordinates in the real space into the coordinates in the virtual space.

For example, the generation unit 155 converts the coordinates of both ends of the pen 200 for operation in the real space into coordinates of the origin 11 and the look-at point 12 of the manipulator 10 in the virtual space. More specifically, the generation unit 155 reflects the position and posture (coordinates of the light emitting units 220A and 220B) of the pen 200 for operation in the position and posture (coordinates of the origin 11 and the look-at point 12) of the manipulator 10. For example, the generation unit 155 converts the coordinates of the light emitting unit 220B in the pen 200 for operation in the real space into coordinates of the origin 11 of the manipulator 10, and converts the coordinates of the light emitting unit 220A into the coordinates of the look-at point 12 of the manipulator 10. As a consequence, the user moves the pen 200 for operation gripped by the hand in the recognition range 190, and thereby can perform an operation as if moving the manipulator 10 gripped by the hand in the virtual space.

Note that it is assumed that the coordinates of the conversion destination are global coordinates as long as not specifically referred to. Note that the global coordinates are coordinates indicating an absolute position in the virtual space. On the other hand, local coordinates are coordinates indicating relative positions with an arbitrary position (simple coordinates or the virtual object) in the virtual space as a reference.

The generation unit 155 may perform coordinate conversion in accordance with enlargement or reduction of the display in the virtual space. For example, the generation unit 155 converts a movement distance of the pen 200 for operation in the recognition range 190 into a movement distance in the virtual space tailored to reduction scale in the virtual space. For example, when the virtual space is enlarged and a part of the virtual object 20 is displayed, a movable region of the manipulator 10 is limited to a part thereof. When the whole virtual object 20 is displayed with the virtual space reduced, the movable region of the manipulator 10 spreads the whole region.

(Virtual Space Displaying Function)

The information processing apparatus 100 (for example, the generation unit 155 and the display control unit 157) has a function for displaying the virtual space. Hereinbelow, the generation unit 155 generates the display control information, and the display control unit 157 controls the display unit 120 to perform the display based on the display control information, that is also simply called display.

For example, the generation unit 155 has a function for generating display control information for displaying a virtual space on the basis of the operation information (second operation information) detected about the pen 200 for operation (second real object). Specifically, the generation unit 155 generates display control information for performing the display reflecting the position and posture of the pen 200 for operation in the manipulator 10 with the coordinate converting function. As a consequence, the user moves the pen 200 for operation gripped by the hand in the recognition range 190, thereby allowing the information processing apparatus 100 to perform the display as if moving the manipulator 10 gripped by the hand in the virtual space. Note that the rotation of the pen 200 for operation in a pen holder direction may be reflected or not reflected in the manipulator 10. The user may set whether or not the reflection is performed. Further, it may be arbitrarily adjusted whether a rate for converting movement (change) to a predetermined axis (direction) of the pen 200 for operation into a movement of the manipulator 10 is reduced, increased, or set to zero (not moved).

Further, the generation unit 155 may allow the pen 200 for operation to correspond to a virtual tool in the virtual space. Specifically, the generation unit 155 may allow the manipulator 10 to have a function as the virtual tool. Further, the generation unit 155 may generate the display control information for performing the display reflecting the use of the virtual tool to the virtual object 20. The virtual tool can be variously considered.

For example, the virtual tool may be a light. For example, the information processing apparatus 100 allows the manipulator 10 to have a function as a light, and sets the origin 11 and the look-at point 12 of the manipulator 10 to the origin and the look-at point of the light. As a consequence, the light emits light from the position (origin 11) in the virtual space corresponding to the position (position of the light emitting unit 220 B) of the pen 200 for operation in the real space to the direction (look-at point 12) in the virtual space corresponding to the posture (the position of the light emitting unit 220A) of the pen 200 for operation in the real space. For example, the information processing apparatus 100 can display a state in which the virtual object 20 is irradiated with the virtual light. For example, as shown in FIG. 6, the manipulator 10 functions as the light, and light (reference symbol 21) that illuminates the back of the virtual object 20 of the vehicle is displayed.

For example, the virtual tool may be a camera. For example, the information processing apparatus 100 allows the manipulator 10 to have a function as a camera and sets the origin 11 and the look-at point 12 of the manipulator 10 to the origin and the look-at point of the camera. As a consequence, the camera is directed from the position (origin 11) in the virtual space corresponding to the position (position of the light emitting unit 220B) of the pen 200 for operation in the real space to the direction (look-at point 12) in the virtual space corresponding to the posture (position of the light emitting unit 220A) of the pen 200 for operation in the real space. For example, the information processing apparatus 100 can display the virtual object 20 captured by the virtual camera.

For example, the virtual tool may be a particle emission device. As the particle emission device, for example, there are an air brush that ejects paint, a fire ejector that discharges fire or smoke, tobacco, and firework. For example, the information processing apparatus 100 allows the manipulator 10 to have a function as an air brush, and sets the origin 11 and the look-at point 12 of the manipulator 10 to the origin and the look-at point of the air brush. As a consequence, the air brush is directed from the position (origin 11) in the virtual space corresponding to the position (position of the light emitting unit 220B) of the pen 200 for operation in the real space to the direction (look-at point 12) in the virtual space corresponding to the posture (position of the light emitting unit 220A) of the pen 200 for operation in the real space. For example, the information processing apparatus 100 can display the virtual object 20 painted with the virtual air brush. Further, in addition to the position or the posture of the pen 200 for operation, the acceleration or the like may be reflected, and physical calculation may be performed in the virtual space. For example, when the user shakes the pen 200 for operation, the paint may be splashed from the look-at point 12 of the manipulator 10 in accordance with the acceleration. Further, the paint may fall according to gravity in the virtual space and scatter to the virtual object 20.

Note that the generation unit 155 may allow the manipulator 10 to have a plurality of functions as a virtual tool. For example, the manipulator 10 may function as a light and also may function as a camera. In this case, it is possible to display a camera image in which a camera photographing range is illuminated with light.

The generation unit 155 may generate display control information for performing display reflecting a parameter related to the working of the virtual tool. As a consequence, the information processing apparatus 100 can control the working of the virtual tool. The parameter can be designated by the user. Further, the parameter can be variously considered.

As the parameter about the light, for example, there are a type of light, color of light, intensity, cone angle, angle of a peripheral portion, drop-off, color of shadow, effect, and the like. Note that the cone angle is an angle of an umbrella of spot light. The angle of the peripheral portion is an angle of light blurred around the edge of light. The drop-off is an attenuation rate towards outside from the center of light. The effect has kinds, such as glow and a lens flare.

As the parameter related to the camera, there are, for example, the type of camera, angle-of-view of the camera, focal length, depth-of-field, zoom, and the like. Further, as another parameter, there is the weight of camera. For example, the generation unit 155 may reproduce camera work in which the camera once passes by a target due to application of centrifugal force to the camera in accordance with the weight of camera, the speed and acceleration of the pen 200 for operation, and the like, and then returns again. The camera work may be reproduced in real time or the amount of return or the camera-shake amount may be adjusted by thereafter adjusting the parameter, such as the weight of camera.

As the parameter related to the particle emission device, for example, there is a type of the particle emission device. Further, for example, as a parameter related to an air brush, there are the shape, size, emission number, emission direction, emission angle, emission speed, emission rate, gravity, viscosity, and the like of particles. As a parameter related to a flame or smoke, there are an amount of fire, brightness, a diffusion angle, a radius just after emission, a radius just before extinction, a fire moving direction, a fire moving speed, the opacity of smoke, turbulence, and the like.

Note that the coordinates of the origin and the look-at point of the manipulator 10 may be also regarded as a parameter.

Further, a slider or the like may be provided to the pen 200 for operation and, for example, a parameter, such as the intensity and a cone angle of light may be dynamically set according to the position of the slider.

(Storing/Reproducing Function)

The information processing apparatus 100 (for example, the storage control unit 153 and the storage unit 140) has a function for storing and reproducing the situation in the virtual space operated by the pen 200 for operation.

For example, the storage control unit 153 causes the storage unit 140 to store information indicating the position and posture of the manipulator 10. Then, the generation unit 155 generates the display control information on the basis of information indicating the past position and posture of the manipulator 10 obtained from the storage unit 140 by the storage control unit 153. As a consequence, the user stores, for example, a preferable way for emitting light, and can refer to the way later.

The information indicating the position and posture of the manipulator 10 may be continuously stored or discretely stored. For example, the storage control unit 153 may continuously store the coordinates of the manipulator 10 for a period during which the button 210C of the pen 200 for operation is pressed, and may store the coordinates of the manipulator 10 at timing when the button 210C is discretely pressed. For example, in a case of continuous storage, the generation unit 155 can reproduce the position and posture of the manipulator 10 as they are, in accordance with information indicating the position and posture continuously stored. On the other hand, in a case of discrete storage, the generation unit 155 links the information indicating the position and posture discretely stored, along the temporal axis, thereby reproducing the position and posture of the manipulator 10.

The description has been given above of technical features of the information processing apparatus 100 according to the present embodiment. Subsequently, a description will be given of an operation processing example of the information processing apparatus 100 according to the present embodiment with reference to FIG. 7.

<3.2. Operation Processing Example>

Figure 7:
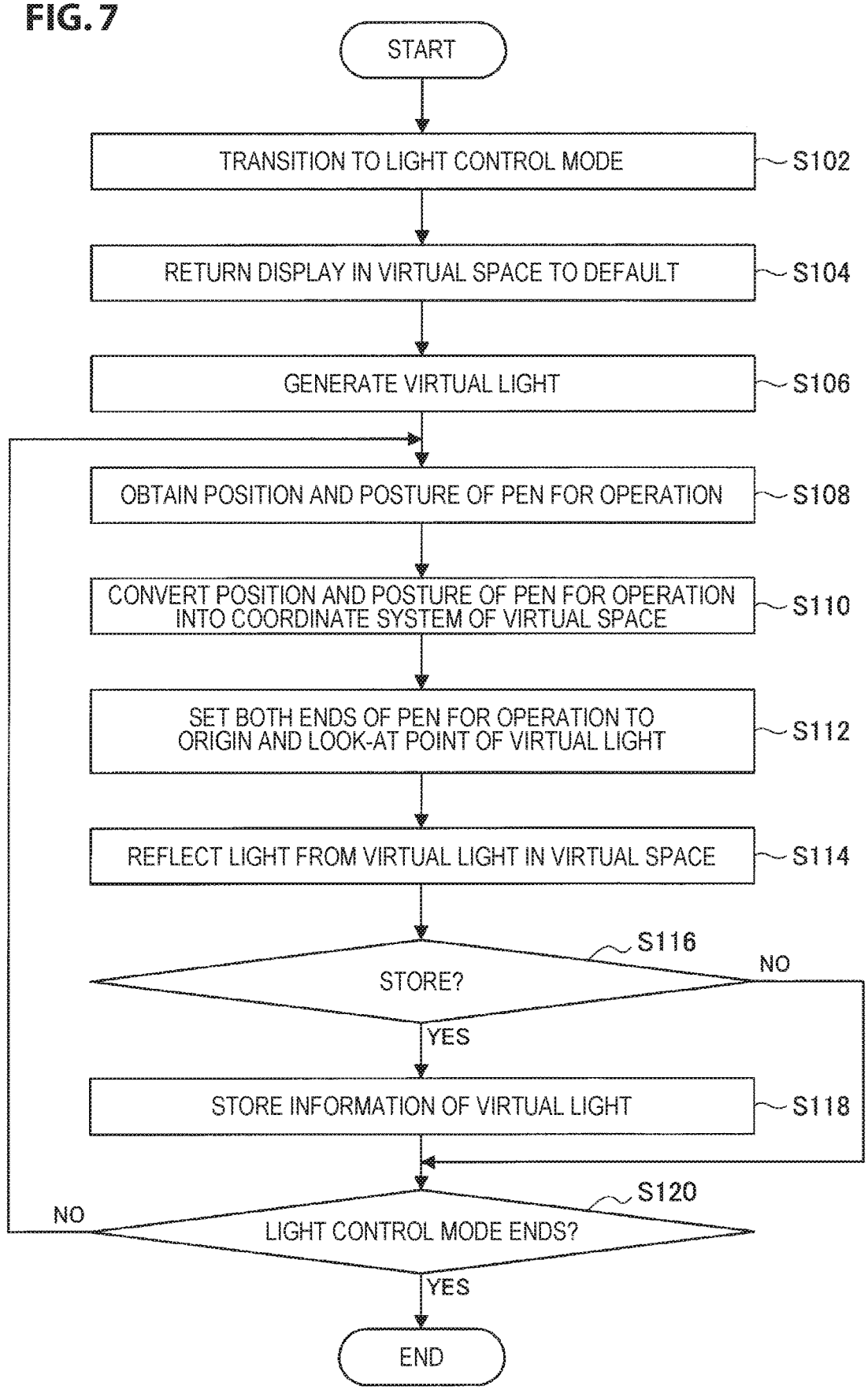
FIG. 7 is a flowchart showing an example of a flow of display processing executed in the information processing apparatus according to the present embodiment.

FIG. 7 is a flowchart showing an example of a flow of displaying processing executed by the information processing apparatus 100 according to the present embodiment. The flow is a processing example in a case where the manipulator 10 functions as a virtual light.

As shown in FIG. 7, first, in step S102, the information processing apparatus 100 transitions to a light control mode. For example, the user presses the button 210B to display an operation mode selecting screen on the projection surface 170 and select the light control mode. The operation mode includes, for example, a drawing mode for allowing the manipulator 10 to function as a virtual drawing tool and a camera control mode for allowing the manipulator 10 to function as a virtual camera. The obtaining unit 151 obtains information indicating that the user has selected the light control mode as mentioned above. Accordingly, the generation unit 155 allows the manipulator 10 to function as a virtual light.

Subsequently, in step S104, the information processing apparatus 100 returns the display in the virtual space to a default. For example, the generation unit 155 and the display control unit 157 perform the display in which the rotated, enlarged or reduced virtual space is returned.

Subsequently, in step S106, the information processing apparatus 100 generates a virtual light. For example, the user causes a type-of-light selecting screen to be displayed on the projection surface 170, and selects the type of light to be used from among a directional light, ambient light, spot light, point light, and the like. The user can simultaneously use a plurality of lights. Further, the user can create a new type of light by designating the parameter himself/herself. In addition to the selection by the user, a light of a default may be selected. The obtaining unit 151 obtains information indicating the parameter designated as mentioned above. Accordingly, the generation unit 155 determines a working of the virtual light.

Subsequently, in step S108, the information processing apparatus 100 obtains the position and posture of the pen 200 for operation. For example, the obtaining unit 151 obtains the position and posture of the pen 200 for operation with an operation information obtaining function.

Subsequently, in step S110, the information processing apparatus 100 converts the position and posture of the pen 200 for operation into the coordinates system in the virtual space. For example, the generation unit 155 converts the coordinates of the light emitting units 220A and 220B of the pen 200 for operation in the real space into the coordinates in the coordinates system in the virtual space with a coordinate converting function.

Subsequently, in step S112, the information processing apparatus 100 sets both ends of the pen 200 for operation to the origin and the look-at point of the virtual light. For example, the generation unit 155 sets the coordinates of the origin 11 of the manipulator 10 to the coordinates of the light emitting unit 220B converted into the coordinates system in the virtual space. Further, the generation unit 155 sets the coordinates of the look-at point 12 of the manipulator 10 to the coordinates of the light emitting unit 220A converted into the coordinates system in the virtual space. Then, the generation unit 155 sets the origin 11 and the look-at point 12 of the manipulator 10 to the origin and the look-at point of light with a virtual space displaying function.

Subsequently, in step S114, the information processing apparatus 100 reflects light from the virtual light in the virtual space. For example, the information processing apparatus 100 displays a state where light is illuminated from the origin 11 to the direction of the look-at point 12 with the virtual space displaying function.

Subsequently, in step S116, the storage control unit 153 determines whether or not to store information. For example, when information indicating that the button 210C is pressed is obtained, the storage control unit 153 determines to store the information (step S116/YES), and the processing advances to step S118. On the other hand, when the information indicating that the button 210C is pressed is not obtained, the storage control unit 153 determines not to store the information, and the processing advances to step S120 (step S116/NO).

In step S118, the information processing apparatus 100 stores information of the virtual light. For example, the storage control unit 153 stores a parameter of the light and information indicating the position and posture.

Subsequently, in step S120, the information processing apparatus 100 determines whether or not to end the light control mode. For example, the user ends the light control mode from a menu displayed on the projection surface 170. When an end instruction of the light control mode by the user is obtained (S120/YES), the generation unit 155 ends the light control mode and turns off the virtual light. On the other hand, when the end instruction of the light control mode by the user is not obtained (S120/NO), the processing returns to step S108 again.

The description has been given above of the first embodiment.

4. Second Embodiment

First, a description will be given of the outline of the information processing apparatus 100 according to the present embodiment with reference to FIGS. 8 and 9.

Figure 8:
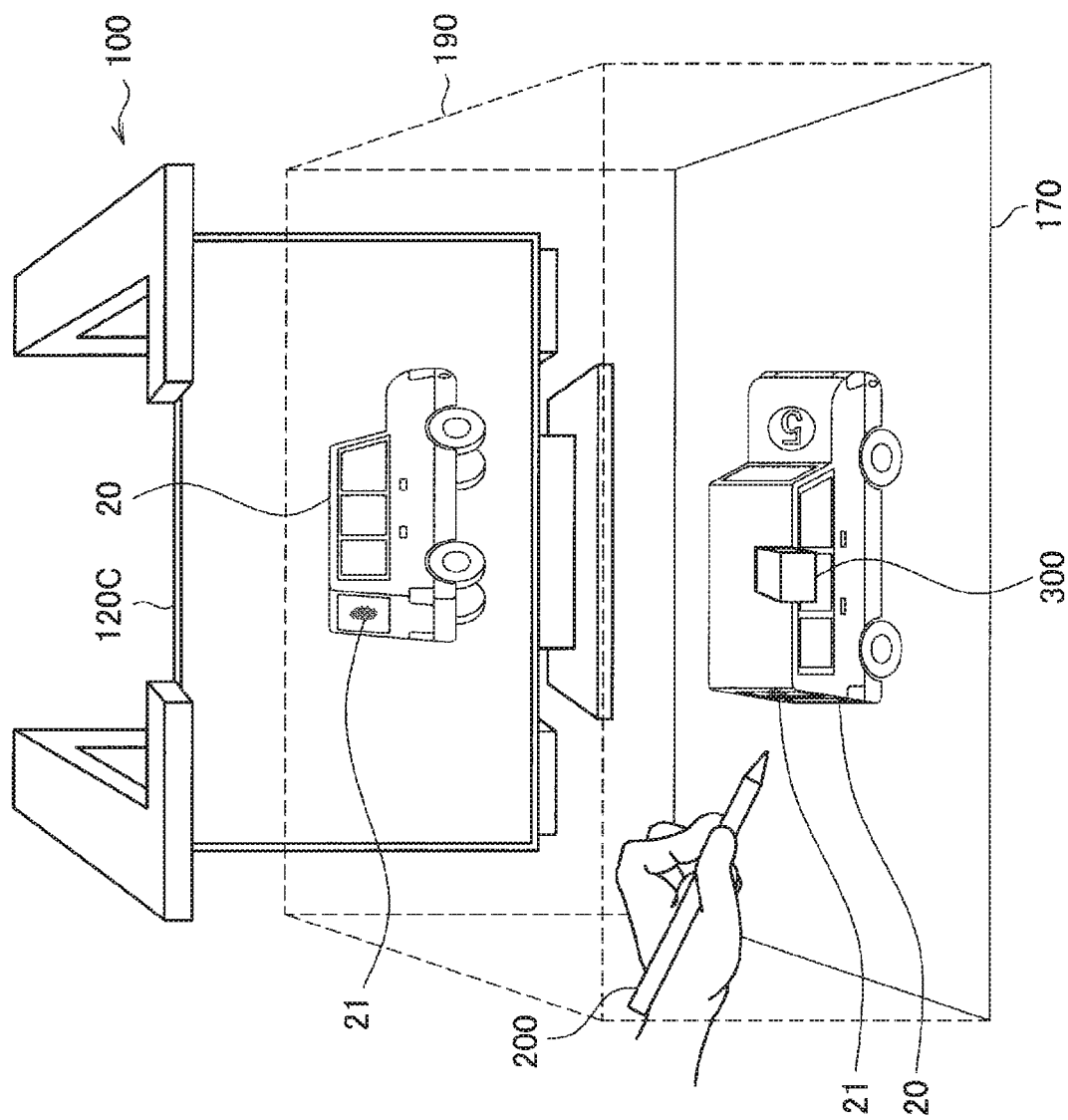
FIG. 8 is a diagram for explaining an outline of the information processing apparatus according to the present embodiment.

FIGS. 8 and 9 are diagrams for explaining the outline of the information processing apparatus 100 according to the present embodiment. As shown in FIG. 8, the user operates the pen 200 for operation and a cube 300 for operation in the recognition range 190. Further, the display 120C displays a state of the virtual object 20 of a vehicle viewed from the side back, and the projection surface 170 displays a state of the virtual object 20 of the vehicle viewed from above. The present embodiment is a form in which the positions and postures of the pen 200 for operation and the cube 300 for operation in the recognition range 190 are reflected in the positions and postures of the manipulator 10 and the virtual object 20. For example, as shown in FIG. 9, the user can perform operations, such as directing the pen 200 for operation to the cube 300 for operation from above or directing the pen 200 for operation from underneath. As a consequence, for example, in the virtual space, light is illuminated to the virtual object 20 from above or light is illuminated from underneath. For example, in the example shown in FIG. 8, since the pen 200 for operation is directed from the back of the cube 300 for operation, light (reference symbol 21) for illuminating the back of the virtual object 20 of the vehicle is displayed.

The cube 300 for operation is a real object operated by the user. As shown in FIG. 8, the cube 300 for operation may be placed on the projection surface 170, gripped by the user's hand, or supported by an arbitrary supporting tool such as a tripod. On the cube 300 for operation, a passive marker such as a barcode for identifying each surface or an augmented reality (AR) marker may be attached to each surface to enable the detection of the posture.

In addition, the cube 300 for operation may have an inertial sensor, such as an acceleration sensor or a gyroscope sensor, a speed sensor, a vibration sensor, or a living-body sensor. Further, the cube 300 for operation may have a communication unit capable of wireless communication by using an arbitrary communication system, such as wireless LAN, Wi-Fi, or Bluetooth, and may transmit and receive various data to/from the information processing apparatus 100.

Hereinbelow, a description will be given of technical features of the information processing apparatus 100 according to the present embodiment. Note that it is assumed that the information processing apparatus 100 according to the present embodiment has technical features described in the aforementioned embodiments.

<4.1. Technical Features>

(Operation Information Obtaining Function)

The operation information in the present embodiment includes information indicating the position and posture of the pen 200 for operation and the cube 300 for operation in the real space. The pen 200 for operation is as described above. Hereinbelow, the cube 300 for operation will be described.

For example, the obtaining unit 151 may recognize an image of the cube 300 for operation from the image information detected by the sensor unit 110, or recognize the height of the cube 300 for operation from the depth information detected by the sensor unit 110 to obtain the position and posture of the cube 300 for operation. In this case, the obtaining unit 151 may recognize identification information attached to each surface of the cube 300 for operation, may recognize the top position of the cube 300 for operation, and may estimate the posture of an AR marker by using an AR algorithm, to obtain the position and posture of the cube 300 for operation.

Further, the obtaining unit 151 may obtain the posture of the cube 300 for operation from the information detected by a sensor included in the cube 300 for operation and received by the communication unit 130. For example, the obtaining unit 151 obtains the posture of the cube 300 for operation from a detection result of gravity acceleration.

In addition, the obtaining unit 151 can obtain, as the operation information, information, such as acceleration or speed, detected by the sensor included in the cube 300 for operation and received by the communication unit 130.

(Coordinate Converting Function)

The information processing apparatus 100 (for example, the generation unit 155) has a function for converting the coordinates of the pen 200 for operation and the cube 300 for operation in the real space into the coordinates in the virtual space. The generation unit 155 may convert the coordinates by using an absolute position of the pen 200 for operation or the cube 300 for operation or by using a relative position thereof.

Case of Using Absolute Position

For example, the generation unit 155 may reflect the position and posture of the cube 300 for operation in the position and posture of the virtual object 20 in the virtual space and also may reflect the position and posture of the pen 200 for operation in the position and posture of the manipulator 10 in the virtual space. For example, the generation unit 155 converts the coordinates of each apex of the cube 300 for operation in the real space into global coordinates of a corresponding point of the virtual object 20. Further, the generation unit 155 converts the coordinates of the light emitting unit 220B of the pen 200 for operation in the real space into the global coordinates of the origin 11 of the manipulator 10, and converts the coordinates of the light emitting unit 220A into the global coordinates of the look-at point 12 of the manipulator 10. As a consequence, the user moves the pen 200 for operation and the cube 300 for operation gripped by the hand in the recognition range 190, thereby enabling to perform the operation as if moving the manipulator 10 and the virtual object 20 gripped by the hand in the virtual space.

Case of Using Relative Position

For example, the generation unit 155 may reflect a relationship in relative position and posture between the cube 300 for operation and the pen 200 for operation in relative positions and postures between the virtual object 20 and the manipulator 10 in the virtual space. For example, the generation unit 155 adds the relative coordinates of the light emitting units 220B and 220A of the pen 200 for operation with the cube 300 for operation as a reference in the real space to the global coordinate of the virtual object 20, thereby calculating the global coordinates of the origin 11 and the look-at point 12 of the manipulator 10. Obviously, the generation unit 155 may add the relative coordinates of the cube 300 for operation with the pen 200 for operation in the real space as a reference to the global coordinates of the pen 200 for operation, thereby calculating the global coordinates of the virtual object 20. As a consequence, the user can reflect a relationship in relative position and posture between the pen 200 for operation and the cube 300 for operation in a relationship in relative position and posture between the manipulator 10 and the virtual object 20.

(Virtual Space Displaying Function)

Since the pen 200 for operation is as described above, hereinbelow, the cube 300 for operation will be described.

In the present embodiment, the generation unit 155 has a function for generating the display control information for displaying the virtual space on the basis of operation information (first operation information) detected about the cube 300 for operation (first real object). Specifically, the generation unit 155 generates display control information for performing display obtained by reflecting the position and posture of the cube 300 for operation in the virtual object 20 with the coordinate converting function. As a consequence, the user moves the cube 300 for operation gripped by the hand in the recognition range 190, thereby allowing the information processing apparatus 100 to perform the display as if moving the virtual object 20 gripped by the hand in the virtual space.

(Storing/Reproducing Function)

The pen 200 for operation is as described above. Therefore, hereinbelow, the cube 300 for operation will be described.

The information processing apparatus 100 (for example, the storage control unit 153 and the storage unit 140) has a function for storing and reproducing the situation in the virtual space operated by the pen 200 for operation and the cube 300 for operation.

For example, the storage control unit 153 stores information indicating the position and posture of the virtual object 20 to the storage unit 140. Then, the generation unit 155 generates the display control information on the basis of information indicating the past position and posture of the virtual object 20 obtained from the storage unit 140 by the storage control unit 153. As a consequence, the user stores, for example, a way of moving a favorite virtual object 20, and can refer to the way later.

As mentioned above, technical features of the information processing apparatus 100 according to the present embodiment have been described. Subsequently, an operation processing example of the information processing apparatus 100 according to the present embodiment will be described with reference to FIGS. 10 and 11.

<4.2. Operation Processing Example>

First, a description will be given of a processing example in a case of using an absolute position in the coordinate converting function with reference to FIG. 10.

Figure 10:
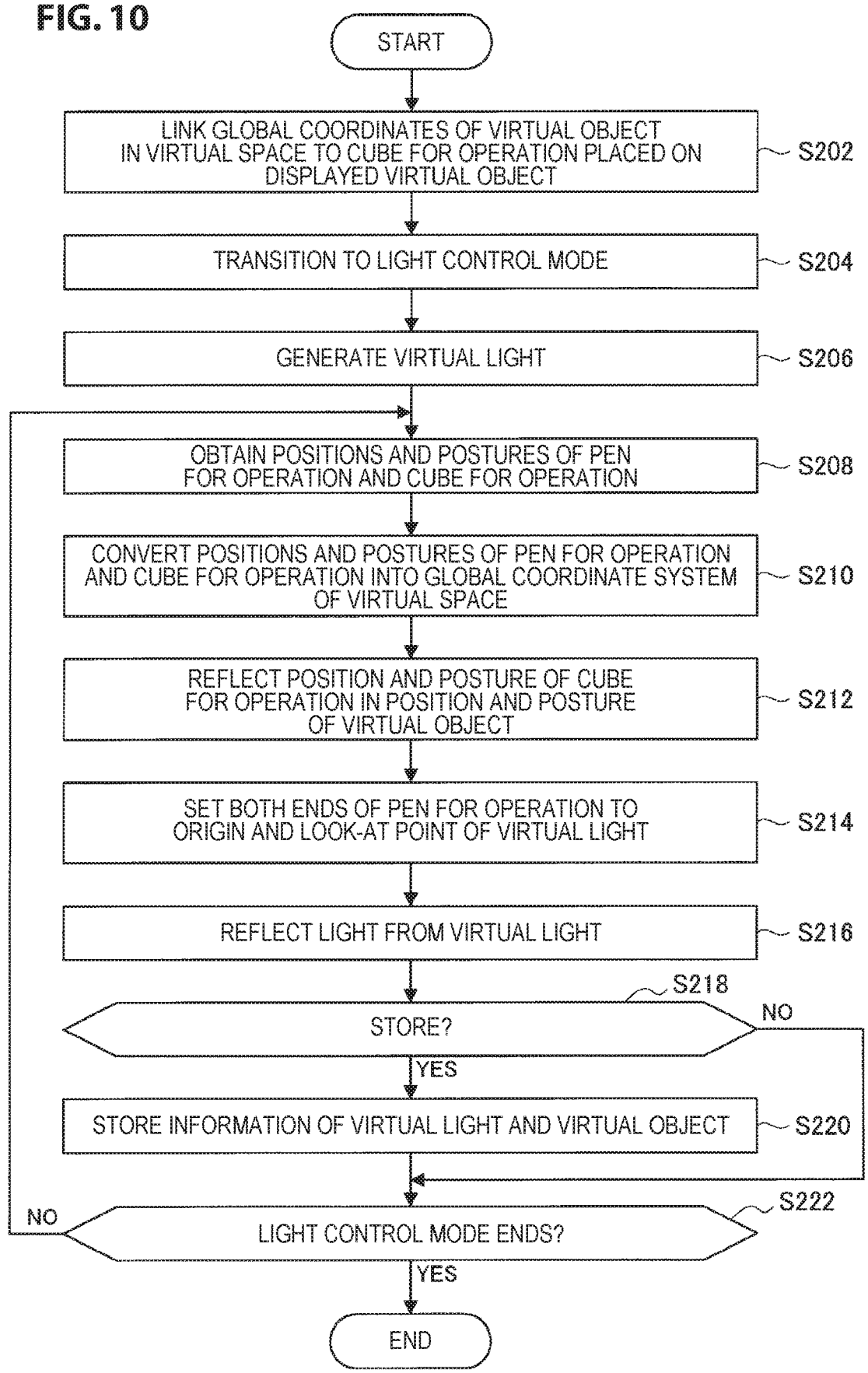
FIG. 10 is a flowchart showing an example of a flow of display processing executed in the information processing apparatus according to the present embodiment.

FIG. 10 is a flowchart showing an example of a flow of display processing executed in the information processing apparatus 100 according to the present embodiment. The flow is a processing example in a case where the manipulator 10 functions as the virtual light.

As shown in FIG. 10, first, in step S202, the information processing apparatus 100 links the global coordinates of the virtual object 20 in the virtual space to the cube 300 for operation placed on the displayed virtual object 20. For example, the user places the cube 300 for operation on the virtual object 20 projected on the projection surface 170. The generation unit 155 recognizes that the cube 300 for operation is placed on the virtual object 20 from the image information and the depth information obtained by the obtaining unit 151 and associates the virtual object 20 with the cube 300 for operation.

Subsequently, in step S204, the information processing apparatus 100 transitions to the light control mode. For example, the information processing apparatus 100 may transition to the light control mode according to selection of the user, or may transition to the light control mode according to a recognition result of a marker attached to the cube 300 for operation.

Subsequently, in step S206, the information processing apparatus 100 generates a virtual light.

Subsequently, in step S208, the information processing apparatus 100 obtains the positions and postures of the pen 200 for operation and the cube 300 for operation. For example, the obtaining unit 151 obtains, with the operation information obtaining function, the positions and postures of the pen 200 for operation and the cube 300 for operation.

Subsequently, in step S210, the information processing apparatus 100 converts the positions and postures of the pen 200 for operation and the cube 300 for operation into the global coordinate system in the virtual space. For example, the generation unit 155 converts, with the coordinate converting function, the coordinates of the pen 200 for operation and the cube 300 for operation in the real space into the global coordinates in the coordinates system of the virtual space.

Subsequently, in step S212, the information processing apparatus 100 reflects the position and posture of the cube 300 for operation in the position and posture of the virtual object 20. For example, the generation unit 155 moves the global coordinates of the linked virtual object 20 to the global coordinates of the cube 300 for operation converted into the coordinates system of the virtual space, and reflects the posture (rotation) of the cube 300 for operation in the posture of the virtual object 20.

Subsequently, in step S214, the information processing apparatus 100 sets both ends of the pen 200 for operation to the origin and the look-at point of the virtual light.

Subsequently, in step S216, the information processing apparatus 100 reflects light from the virtual light in the virtual space.

Subsequently, in step S218, the storage control unit 153 determines whether or not to store information. When it is determined to store information (step S218/YES), the processing advances to step S220. When it is determined not to store information, the processing advances to step S222 (step S218/NO).

In step S220, the information processing apparatus 100 stores information of the virtual light and the virtual object 20. For example, the storage control unit 153 stores information indicating a parameter, position and posture of the light, and information indicating the position and posture of the virtual object 20.

Subsequently, in step S222, the information processing apparatus 100 determines whether or not to end the light control mode. For example, when an end instruction of the light control mode by the user is obtained (S222/YES), the generation unit 155 ends the light control mode to turn off the virtual light. On the other hand, when the end instruction of the light control mode by the user is not obtained (S222/NO), the processing returns to step S208 again.

The description has been given above of a processing example in a case of using an absolute position in the coordinate converting function. Subsequently, a description will be given of the processing example in the case of using the relative position in the coordinate converting function with reference to FIG. 11.

Figure 11:
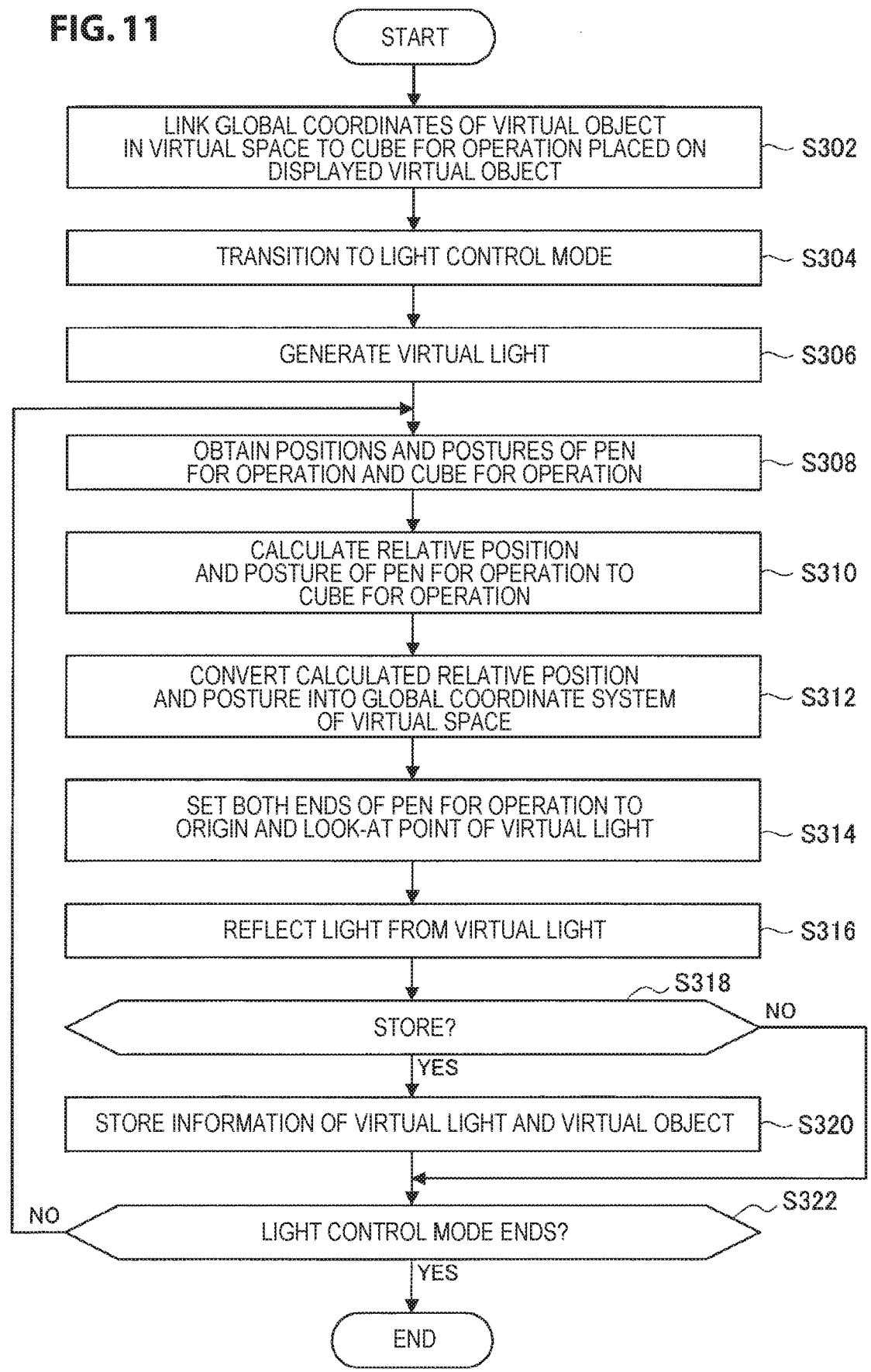
FIG. 11 is a flowchart showing an example of a flow of display processing executed in the information processing apparatus according to the present embodiment.

FIG. 11 is a flowchart showing an example of a flow of displaying processing executed by the information processing apparatus 100 according to the present embodiment. The flow is a processing example in a case where the manipulator 10 functions as the virtual light.

As shown in FIG. 11, first, in steps S302 to S308, similar processing to that in the steps S202 to S208 described with reference to FIG. 10 is performed.

Thereafter, in step S310, the information processing apparatus 100 calculates relative position and posture of the pen 200 for operation to the cube 300 for operation. For example, the generation unit 155 calculates the relative coordinates of the light emitting units 220B and 220A of the pen 200 for operation with the cube 300 for operation in the real space as a reference.

Subsequently, in step S312, the information processing apparatus 100 converts the calculated relative position and posture into the global coordinate system in the virtual space. For example, the generation unit 155 adds the relative coordinates calculated in step S310 to the global coordinates of the virtual object 20, thereby identifying the global coordinates of the manipulator 10.

Thereafter, in steps S314 to S322, the processing similar to that in the steps S214 to S222 described with reference to FIG. 10 is performed.

The second embodiment has been described above.

5. Third Embodiment

First, a description will be given of the outline of the information processing apparatus 100 according to the present embodiment with reference to FIGS. 12 and 13.

Figure 12:
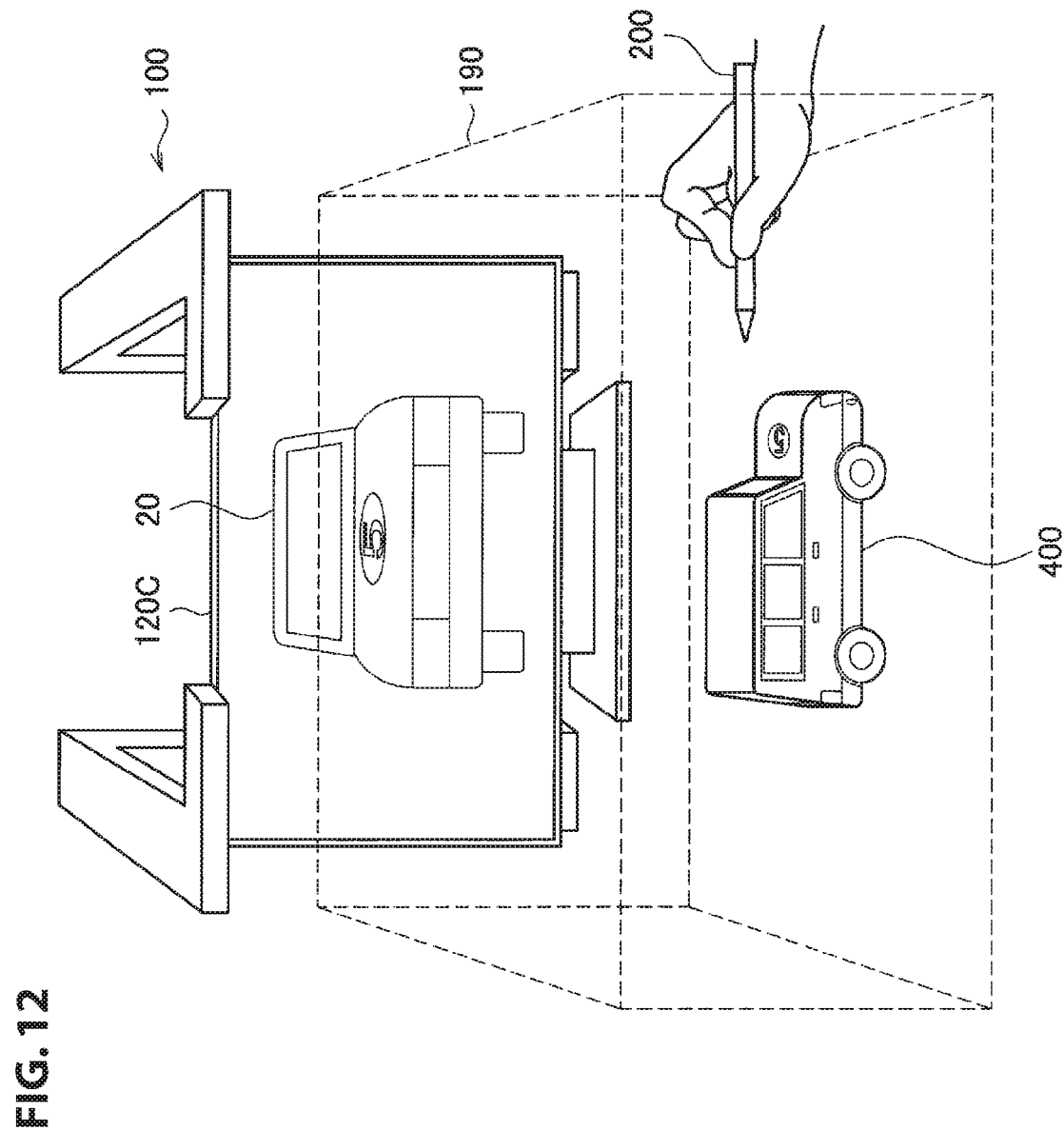
FIG. 12 is a diagram for explaining an outline of the information processing apparatus according to the present embodiment.

FIG. 12 is a diagram for explaining the outline of the information processing apparatus 100 according to the present embodiment. As shown in FIG. 12, the user places a model object 400 in the recognition range 190, and operates the pen 200 for operation. The model object 400 is a real object that functions as the cube 300 for operation. As shown in FIG. 12, the model object 400 is shaped with a vehicle, and the texture (pattern, color, etc.) of the vehicle is projection-mapped. In the example shown in FIG. 12, the manipulator 10 functions as a camera. As shown in FIG. 12, the pen 200 for operation is directed to the front of the model object 400. Therefore, a camera image of the virtual object 20 viewed from the front is displayed on the display 120C.

Figure 13:
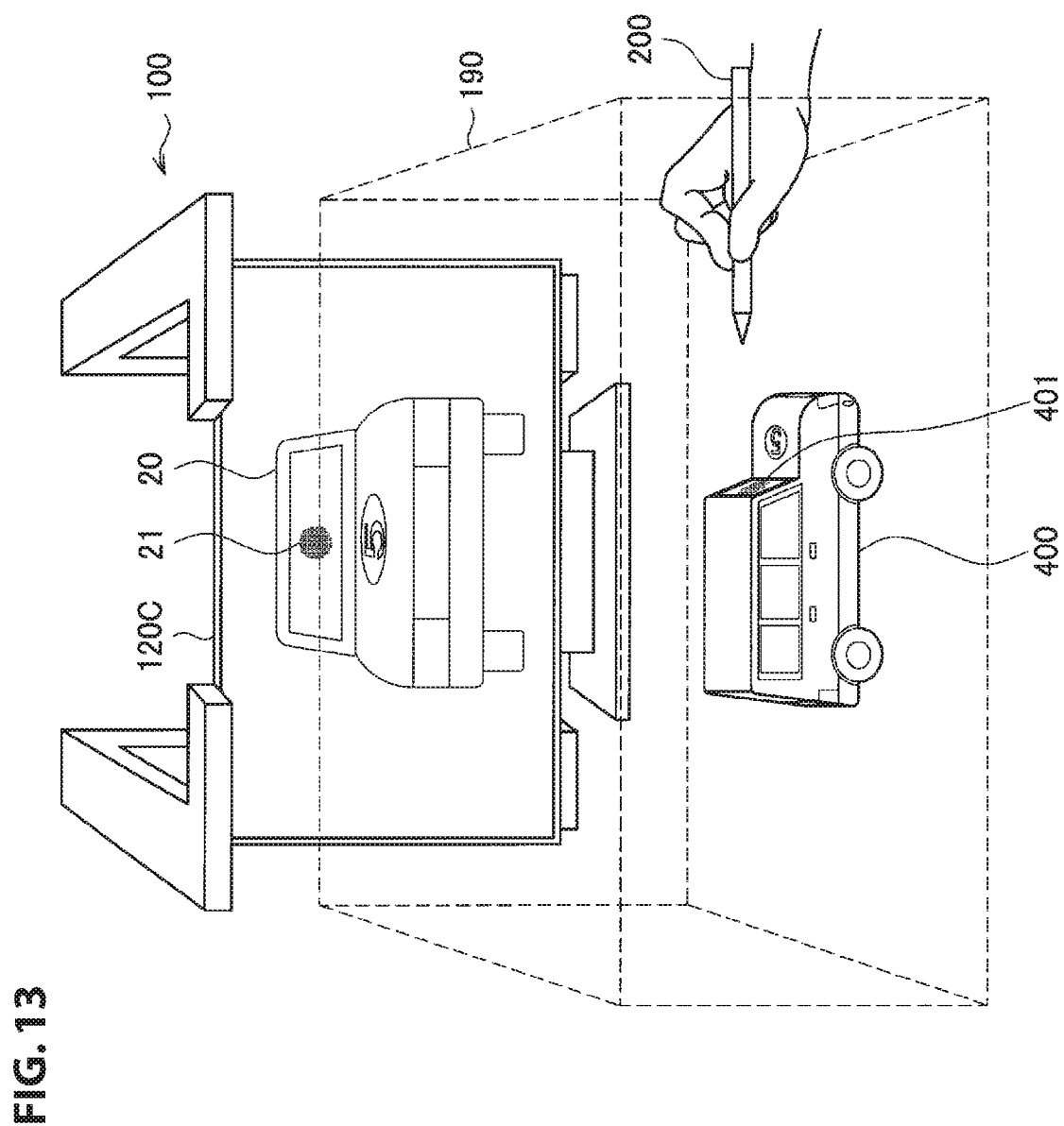
FIG. 13 is a diagram for explaining an outline of the information processing apparatus according to the present embodiment.

FIG. 13 is a diagram for explaining the outline of the information processing apparatus 100 according to the present embodiment. As shown in FIG. 13, the model object 400 is shaped like a vehicle, and the texture of the vehicle is projection-mapped. In the example shown in the diagram, the manipulator 10 functions as a light. As shown in FIG. 13, the pen 200 for operation is directed to the front of the model object 400. Therefore, light (reference symbol 21) that illuminates the front of the virtual object 20 is displayed on the display 120C. Further, to the model object 400, light (reference symbol 401) directed to the front thereof is projection-mapped.

Hereinbelow, technical features of the information processing apparatus 100 according to the present embodiment will be described. Note that it is assumed that the information processing apparatus 100 according to the present embodiment has the technical features described in the aforementioned embodiments.

<5.1. Technical Features>

(Projection Mapping Function)

The information processing apparatus 100 according to the present embodiment (for example, the generation unit 155) has a function for generating display control information for projection mapping. A real object as a target of the projection mapping is variously considered. For example, the projection mapping may be performed to an arbitrary real object, such as the user's hand, the pen 200 for operation, the cube 300 for operation, or the model object 400 existing in the recognition range 190. Herein, the projection mapping indicates that an image is projected to a real object with a three-dimensional shape. For example, the generation unit 155 first recognizes the three-dimensional shape of the real object, such as the model object 400, by using the image information and the depth information. Subsequently, the generation unit 155 generates display control information for controlling the image projected from the projectors 120 on the basis of a recognition result of the three-dimensional shape. Then, the display control unit 157 controls the projectors 120 to perform the projection based on the generated display control information. As mentioned above, the projection mapping to the real object is realized.

The information processing apparatus 100 may perform the projection mapping to the real object corresponding to the virtual object 20. As the real object, in addition to the model object 400 shown in FIGS. 12 and 13, there is the cube 300 for operation and the like. As a consequence, the user can further intuitively grasp contents (for example, the vehicle) of the virtual object corresponding to the real object. Note that the projection mapping may be performed on the side of the 3DCG application.

(Virtual Space Displaying Function)

The information processing apparatus 100 (for example, the generation unit 155) according to the present embodiment may perform the display corresponding to the texture projection-mapped to the real object corresponding to the virtual object 20. In the example shown in FIG. 12, the texture of the vehicle is projection-mapped to the model object 400. Therefore, the generation unit 155 may generate display control information for displaying the virtual object 20 with the projection-mapped texture drawn on the surface. In this case, in the example shown in FIG. 12, the display 120C displays a camera image of the virtual object 20 with the projection-mapped texture drawn on the surface, viewed from the front. The light or the like is similar. As a consequence, the information processing apparatus 100 can reduce the difference between a state in the real space and a state in the virtual space.

Note that the generation unit 155 may obtain which texture is projection-mapped, from a main component (for example, the display control unit 157 or the 3DCG application) that performs the projection mapping or may obtain from an image recognition result.

(Parameter Displaying Function)

The information processing apparatus 100 (for example, the generation unit 155 and the display control unit 157) may have a function for displaying the parameter of the virtual tool.

For example, the generation unit 155 may generate the display control information for displaying the parameter at a place related to the pen 200 for operation. As the place related to the pen 200 for operation for displaying the parameter, for example, there is the pen 200 for operation itself or the user's hand gripping the pen 200 for operation. For example, the projector 120 projection-maps the parameter to the user's hand gripping the pen 200 for operation. As a consequence, the user can easily grasp the coordinate information of the manipulator 10, the intensity of light or the like while operating the pen 200 for operation.

The technical features of the information processing apparatus 100 according to the present embodiment have been described above. Subsequently, an operation processing example of the information processing apparatus 100 according to the present embodiment will be described with reference to FIGS. 14 and 15.

<5.2. Operation Processing Example>

Figure 14:
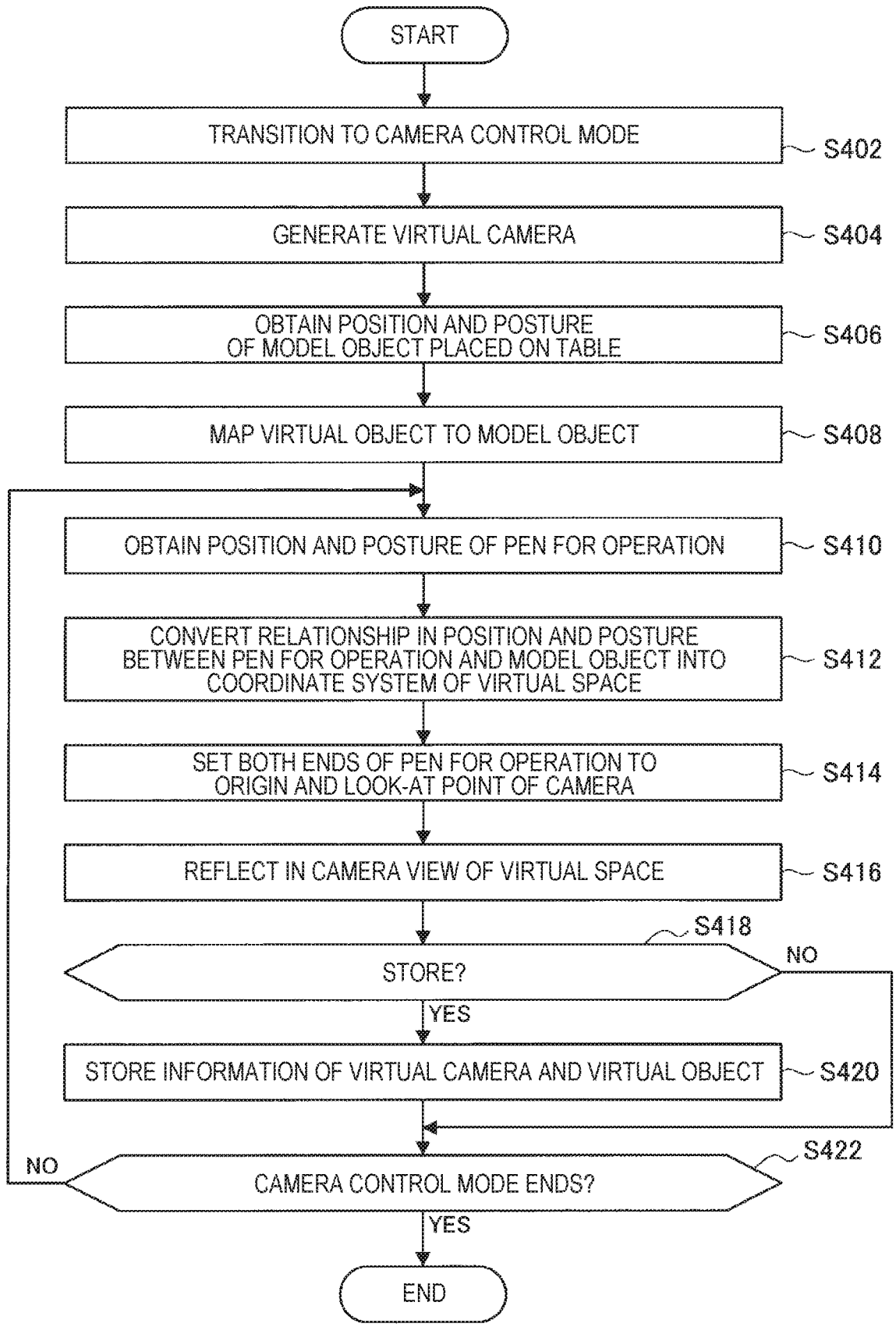
FIG. 14 is a flowchart showing an example of a flow of display processing executed in the information processing apparatus according to the present embodiment.

FIG. 14 is a flowchart showing an example of a flow of displaying processing executed by the information processing apparatus 100 according to the present embodiment. The flow is a processing example in a case where the manipulator 10 functions as the virtual camera.

As shown in FIG. 14, first, in step S402, the information processing apparatus 100 transitions to a camera control mode. For example, the information processing apparatus 100 may transition to the camera control mode according to selection of the user.

Subsequently, in step S404, the information processing apparatus 100 generates the virtual camera. For example, the user allows the projection surface 170 to display a parameter, such as a focal length of a camera, and designates the parameter. In addition to the designation of the user, the parameter of a default may be used. The obtaining unit 151 obtains information indicating the designated parameter. The generation unit 155 determines a working of the virtual camera according to the information.

Subsequently, in step S406, the information processing apparatus 100 obtains the position and posture of the model object 400 placed on the table 180. For example, the obtaining unit 151 obtains the position and posture of the model object 400 with the operation information obtaining function.

Subsequently, in step S408, the information processing apparatus 100 performs mapping of the virtual object to the model object 400. In this case, the information processing apparatus 100 may projection-map arbitrary texture to the model object 400. Further, the texture to be mapped may be selected by the user from, for example, a GUI menu.

Subsequently, in step S410, the information processing apparatus 100 obtains the position and posture of the pen 200 for operation.

Subsequently, in step S412, the information processing apparatus 100 converts a relation in position and posture between the pen 200 for operation and the model object 400 into the coordinate system of the virtual space. At this time, the information processing apparatus 100 may convert the coordinates by using an absolute position of the pen 200 for operation and the model object 400 or by using a relative position thereof.

Subsequently, in step S414, the information processing apparatus 100 sets both ends of the pen 200 for operation to the origin and the look-at point of the virtual camera. For example, the generation unit 155 sets the origin 11 and the look-at point 12 of the manipulator 10 to the origin and the look-at point of a camera with a virtual space displaying function.

Subsequently, in step S416, the information processing apparatus 100 reflects information in a camera view of the virtual space. For example, the generation unit 155 displays a state in the virtual space captured by the virtual camera directed to the direction of the look-at point 12 from the origin 11 with the virtual space displaying function.

Subsequently, in step S418, the storage control unit 153 determines whether or not to store information. When it is determined to store information (step S418/YES), the processing advances to step S420. When it is determined not to store information, the processing advances to step S422 (step S418/NO).

In step S420, the information processing apparatus 100 stores information of the virtual camera and the virtual object 20. For example, the storage control unit 153 stores information indicating the parameter, the position and posture of the camera, and information indicating the position and posture of the virtual object 20.

Subsequently, in step S422, the information processing apparatus 100 determines whether or not to end the camera control mode. For example, when an end instruction of the camera control mode by the user is obtained (S422/YES), the generation unit 155 ends the camera control mode to turn off the virtual camera. On the other hand, when the end instruction of the camera control mode by the user is not obtained (S422/NO), the processing returns to step S410 again.

The processing example in the case where the manipulator 10 functions as the virtual camera has been described above. Subsequently, a description will be given of a processing example in a case where the manipulator 10 functions as the virtual light with reference to FIG. 15.

Figure 15:
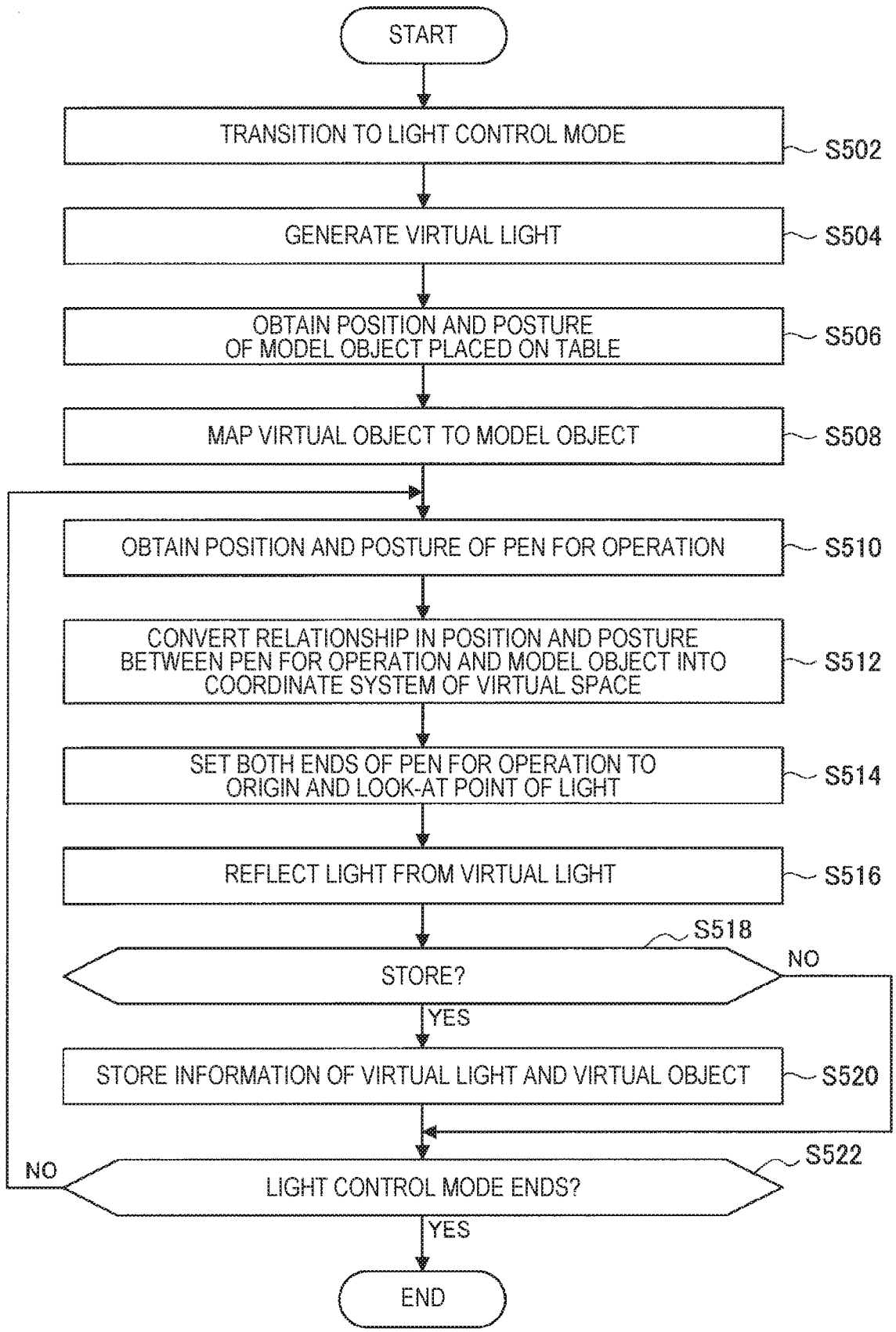
FIG. 15 is a flowchart showing an example of a flow of display processing executed in the information processing apparatus according to the present embodiment.

FIG. 15 is a flowchart showing an example of a flow of displaying processing executed in the information processing apparatus 100 according to the present embodiment.

As shown in FIG. 15, first, in step S502, the information processing apparatus 100 transitions to the light control mode. Subsequently, in step S504, the information processing apparatus 100 generates the virtual light.

Thereafter, in steps S506 to S512, similar processing to that in the steps S406 to S412 described with reference to FIG. 14 is performed.

Subsequently, in step S514, the information processing apparatus 100 sets both ends of the pen 200 for operation to the origin and the look-at point of the virtual light.

Subsequently, in step S516, the information processing apparatus 100 reflects light of the virtual light in the virtual space.

Thereafter, in steps S518 to S522, processing similar to the processing in the steps S418 to S422 described with reference to FIG. 14 is performed.

The third embodiment has been described above.

6. Fourth Embodiment

First, a description will be given of the outline of the information processing apparatus 100 according to the present embodiment with reference to FIG. 16.

Figure 16:
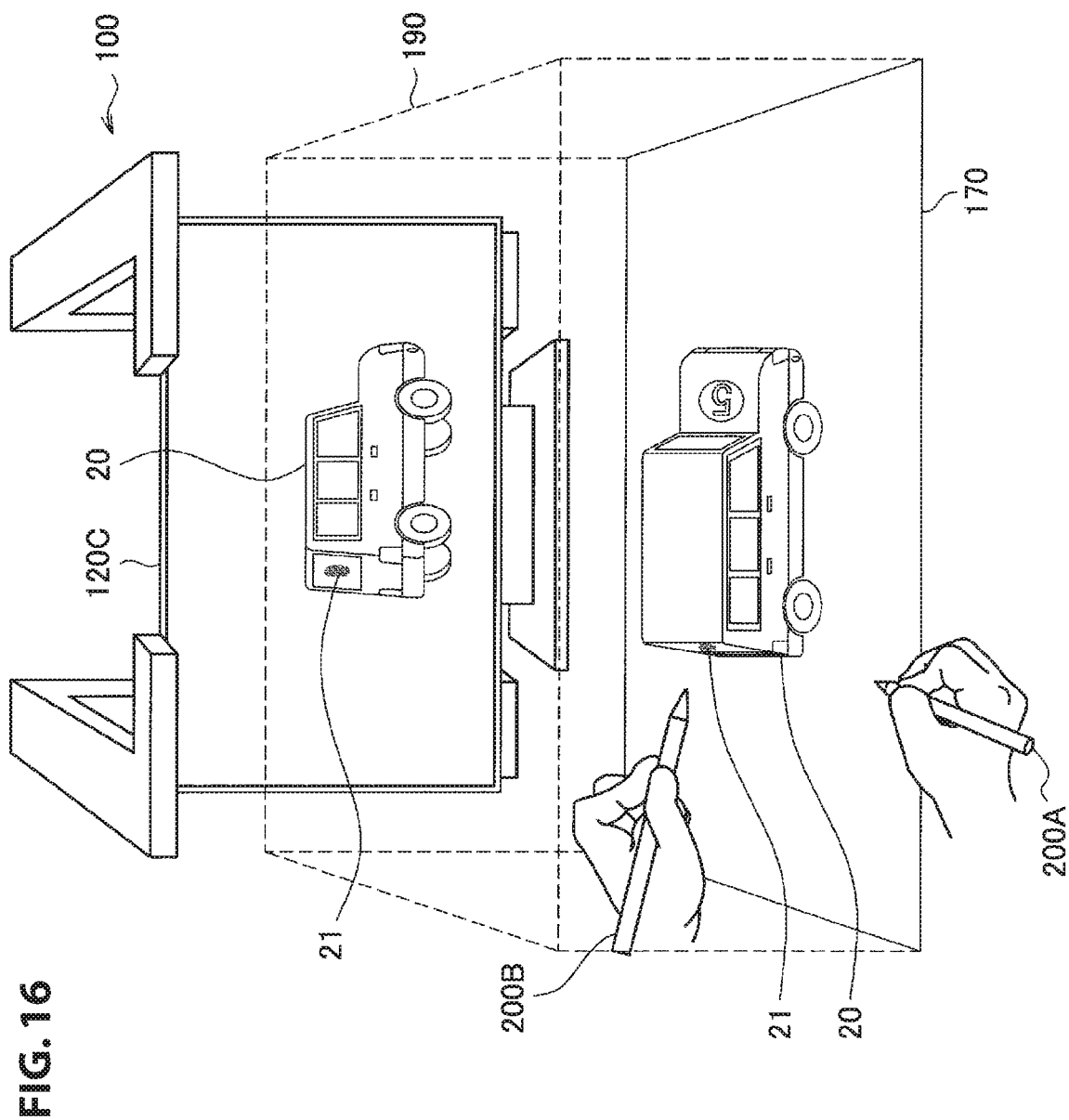
FIG. 16 is a diagram for explaining an outline of the information processing apparatus according to the present embodiment.

FIG. 16 is a diagram for explaining the outline of the information processing apparatus 100 according to the present embodiment. As shown in FIG. 16, the user operates pens 200A and 200B for operation in the recognition range 190. In the example shown in FIG. 16, the manipulator 10 corresponding to the pen 200A for operation functions as a camera, and the manipulator 10 corresponding to the pen 200B for operation functions as the light. As shown in FIG. 16, the pen 200A for operation is directed to the side back of the virtual object 20 displayed on the projection surface 170. Therefore, a camera image of the virtual object 20 viewed from the side back is displayed on the display 120C. Further, since the pen 200 for operation is directed to the virtual object 20 displayed on the projection surface 170, from the back thereof, light (reference symbol 21) that illuminates the back of the virtual object 20 is displayed.

The generation unit 155 according to the present embodiment generates display control information on the basis of each of a plurality of pieces of operation information detected about a plurality of the pens 200 for operation. As a consequence, as shown in FIG. 16, it is possible to display the virtual space that reflects an operation using a plurality of the pens 200 for operation. In the example shown in FIG. 16, a plurality of the manipulators 10 functions as different virtual tools. However, the technology is not limited to the example. A plurality of the manipulators 10 may function as the same virtual tool.

7. Fifth Embodiment

The present embodiment is a form for performing camera-shake correction.

As mentioned above, the information processing apparatus 100 has a storing/reproducing function, thereby enabling reproduction of the situation of the virtual space with reference to the information (for example, information of the virtual light, virtual camera, and virtual object 20) indicating the situation of the virtual space stored in the storage unit 140. The information processing apparatus 100 according to the present embodiment can smoothly store or reproduce the situation of the virtual space with a camera shake correction function.

First, with reference to FIG. 17, the camera shake correction function at storage time will be described. FIG. 17 is a diagram for explaining an example of the camera shake correction function according to the present embodiment. As shown in FIG. 17, the user grips the pen 200 for operation with fingers. In a case where, for example, when the button 210B of the pen 200 for operation shown in FIG. 4 is pressed, the information processing apparatus 100 stores the coordinates of the manipulator 10, the pen 200 for operation may shake when the user presses the button 210B, which may cause an influence on the coordinates to be stored. Therefore, the storage control unit 153 may store the coordinates of the manipulator 10 at timing when the user detaches the fingers placed on the pen 200 for operation. As shown in FIG. 17, the pen 200 for operation may have a touch sensor 210D, which is assumed to detect whether the fingers are touched or detached. As a consequence, the shaking of the pen 200 for operation is reduced, and the shaking of the camera is reduced. The storage control unit 153 may correct and store the coordinates along grids in the coordinate space of the 3DCG application. In this case, the camera shake correction function is further improved.

Subsequently, a description will be given of the camera shake correction function at reproducing time with reference to FIG. 18. FIG. 18 is a diagram for explaining an example of the camera shake correction function according to the present embodiment. As shown in FIG. 18, it is assumed that information of the discrete coordinates 401 to 404 are stored into the storage unit 140. For example, when actual movement of the hand passes through an orbit 410, the information processing apparatus 100 interpolates an interval between the respective coordinates with a spline curve or the like, and an orbit 420 can be thus generated at reproducing time. The information processing apparatus 100 may reproduce a state of the virtual space along the orbit 420.

The information processing apparatus 100 may have the camera shake correction function related to the operation information obtaining function in addition to the storing/reproducing function.

For example, the information processing apparatus 100 (for example, the generation unit 155) may perform movement prediction with a Kalman filter on the basis of the current position of the pen 200 for operation and a state before one step, and may correct the camera-shake. Further, the information processing apparatus 100 may dynamically control the correction degree with the camera shake correction function, in accordance with the scale in the virtual space.

For example, the information processing apparatus 100 may ring sound effects with ten steps or the like, corresponding to the height of the pen 200 for operation, or may projection-maps information indicating the position of the pen 200 for operation or the cube 300 for operation to the cube 300 for operation. As a consequence, the user can intuitively and finely perform an operation consciously with coordinates, such as horizontal movement.

Note that the ON/OFF of the camera shake correction function, correction degree, and the like may be arbitrarily set by the user.

8. Example of Hardware Configuration

Figure 19:
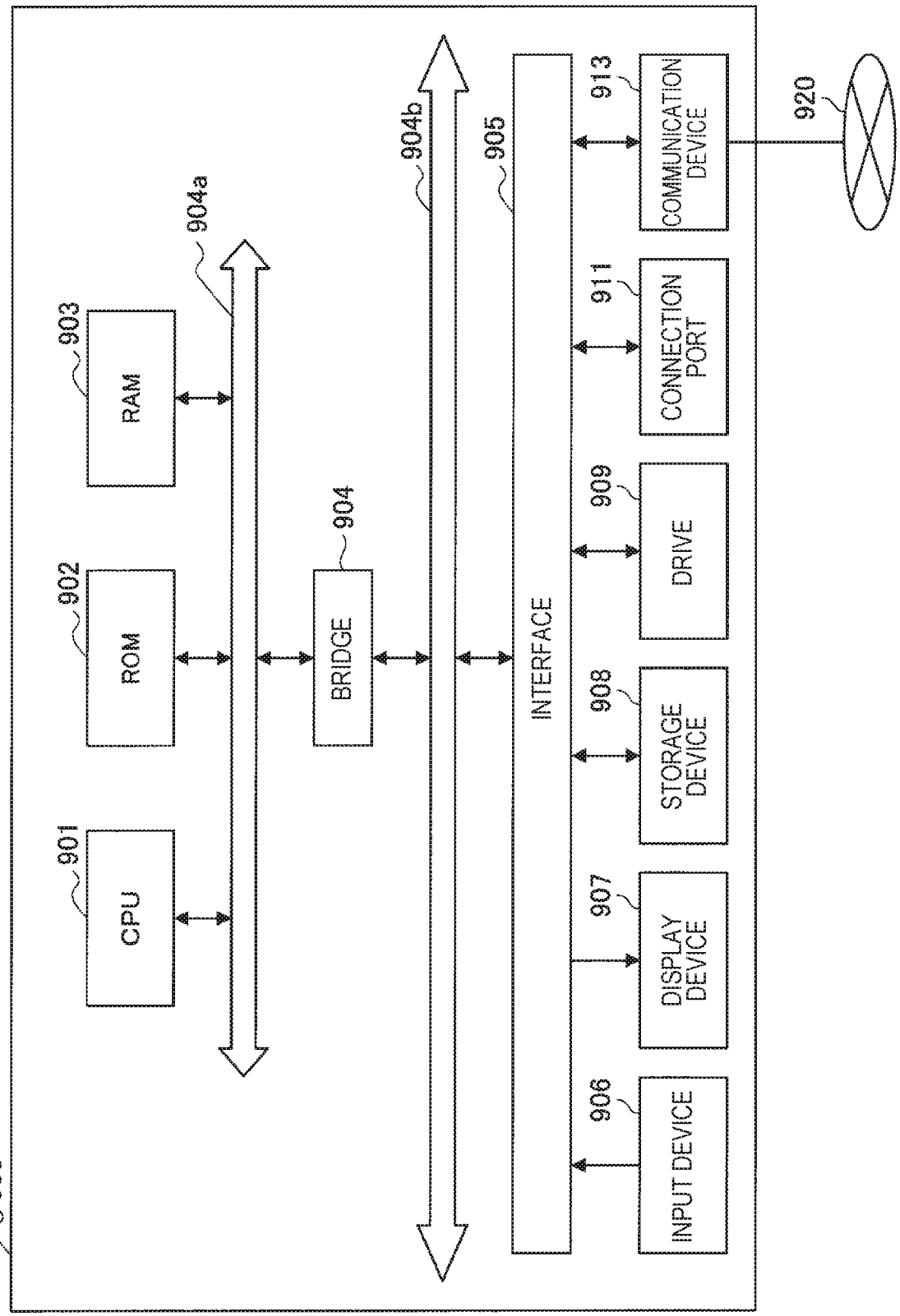
FIG. 19 is a block diagram showing an example of a hardware configuration of the information processing apparatus according to the present embodiment.

Finally, a hardware configuration of an information processing apparatus according to the present embodiment will be described with reference to FIG. 19. FIG. 19 is a block diagram illustrating an example of the hardware configuration of the information processing apparatus according to the present embodiment. Meanwhile, the information processing apparatus 900 illustrated in FIG. 19 may realize the information processing apparatus 100 illustrated in FIG. 5, for example. Information processing by the information processing apparatus 100 according to the present embodiment is realized according to cooperation between software and hardware described below.

As illustrated in FIG. 19, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911, and a communication device 913. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. The CPU 901 may form the controller 150 illustrated in FIG. 5, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, for example, a mouse, a keyboard, a touch panel, a button, a microphone, a switch, a lever of the like. Further, the input device 906 may be a device that detects an operation of the user or an operation of the real object within a sensing range of an image sensor that can capture an image, a depth sensor that can obtain depth information, or the like. In addition, the input device 906 may be a remote control device using infrared ray or other electric waves or external connection equipment such as a cellular phone or a PDA corresponding to manipulation of the information processing apparatus 900, for example.

Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by manipulating the input device 906. The input device 906 may form the sensor unit 110 illustrated in FIG. 5, for example.

The output device 907 is formed by a device that may visually or aurally notify the user of acquired information. As such devices, there is a display device such as a laser projector, a LED projector, a CRT display device, a liquid crystal display device, a plasma display device, an EL display device or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals. The aforementioned display device may form the display unit 120 illustrated in FIG. 5, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording medium recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage unit 140 illustrated in FIG. 5, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the communication unit 130 illustrated in FIG. 5, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

9. Conclusion

The specific description has been given above of the embodiments of the present disclosure with reference to FIGS. 1 to 19. As mentioned above, the information processing apparatus 100 according to the present embodiments displays the virtual space on the basis of the operation information detected about the real object (for example, the cube 300 for operation or the model object 400) corresponding to the virtual object in the virtual space and the second operation information detected about the real object (for example, the pen 200 for operation) corresponding to the virtual tool in the virtual space. As a consequence, the user can intuitively and easily operate the virtual object 20 and the manipulator 10 in the virtual space by using, for example, a positional relation between the cube 300 for operation and the pen 200 for operation. Furthermore, the user operates the cube 300 for operation while changing the position and direction of the light by operating the pen 200 for operation, thereby enabling individual and simultaneous operations of the manipulator 10 and the virtual object 20 to change the position and direction of the virtual object 20.

Further, the information processing apparatus 100 according to the present embodiment may perform the projection mapping to the real object. Further, the information processing apparatus 100 may perform the display in accordance with the projection-mapped texture. As a consequence, the user can use the 3DCG application under more intuitive operational environment using the model object 400 to which the texture is mapped.

Further, the information processing apparatus 100 according to the present embodiment may perform display reflecting the use of the virtual tool to the virtual object. For example, the user can allow the manipulator 10 corresponding to the pen 200 for operation to function as a light or function as a camera. Therefore, the technology facilitates, for example, visual confirmation such as checking a viewing way from the line-of-sight of a person in an architectural model, and enables the use for presentation application to a client as well as creation application. Further, the technology can be also used for medical application such as checking a viewing way from an endoscope in the body cavity. Further, the technology allows the manipulator 10 to function as a drum stick, thereby enabling, for example, the use for application for trial play of instrument.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Meanwhile, devices described in the specification may be realized as independents devices or part of or all devices may be realized as separate devices. For example, in the example of the functional configuration of the information processing apparatus 100 illustrated in FIG. 5, the storage unit 140 and the controller 150 may be included in a device such as a server connected to the sensor unit 110, the display unit 120 and the communication unit 130 through a network or the like.

Note that it is not necessary for the processing described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art on the basis of the description of this specification.

Additionally, the present technology may also be configured as below.

(1)
An information processing apparatus including:
a generation unit configured to generate display control information for displaying a virtual space on a basis of first operation information detected about a first real object corresponding to a virtual object in the virtual space and second operation information detected about a second real object corresponding to a virtual tool in the virtual space.

(2)
The information processing apparatus according to (1),
in which the first operation information includes information indicating position and posture of the first real object, and the second operation information includes information indicating position and posture of the second real object.

(3)
The information processing apparatus according to (2),
in which the generation unit generates the display control information for projection mapping to the first real object.

(4)
The information processing apparatus according to (3),
in which the generation unit generates the display control information for controlling an image projected from a projector on a basis of a recognition result of a three-dimensional shape of the first real object.

(5)
The information processing apparatus according to (3) or (4),
in which the generation unit generates the display control information for performing display in accordance with a texture projection-mapped to the first real object.

(6)
The information processing apparatus according to any one of (2) to (5),
in which the generation unit generates the display control information reflecting a parameter related to a working of the virtual tool.

(7)
The information processing apparatus according to (6),
in which the generation unit generates the display control information for displaying the parameter at a place related to the second real object.

(8)
The information processing apparatus according to any one of (2) to (7),
in which the generation unit generates the display control information for performing display reflecting use of the virtual tool to the virtual object.

(9)
The information processing apparatus according to (8),
in which the virtual tool is a light.

(10)
The information processing apparatus according to (9),
in which a parameter related to a working of the tool includes any one of a type of light, color of light, intensity, a cone angle, an angle of a peripheral part, drop-off, color of shadow, and an effect.

(11)
The information processing apparatus according to (8),
in which the virtual tool is a camera.

(12)
The information processing apparatus according to (11),
in which a parameter related to a working of the tool includes any one of a type of camera, an angle-of-view of camera, a focal length of camera, a depth-of-field of camera, zoom, and weight of camera.

(13)
The information processing apparatus according to (8),
in which the virtual tool is a particle emission device.

(14)
The information processing apparatus according to (13),
in which a parameter related to a working of the tool includes any one of a type of particle emission device, and shape, size, emission number, emission direction, emission angle, emission speed, emission rate, gravity, and viscosity of particles.

(15)
The information processing apparatus according to any one of (2) to (14),
in which the generation unit reflects a relationship in relative position and posture between the first real object and the second real object in relative position and posture between the virtual object and the virtual tool in the virtual space.

(16)
The information processing apparatus according to any one of (2) to (15),
in which the generation unit reflects the position and posture of the first real object in position and posture of the virtual object in the virtual space and reflects the position and posture of the second real object in position and posture of the virtual tool in the virtual space.

(17)

The information processing apparatus according to any one of (2) to (16), further including:

a storage control unit configured to cause a storage unit to store information indicating position and posture of each of the virtual object and the virtual tool, in which the generation unit generates the display control information on a basis of past information obtained from the storage unit by the storage control unit.

(18)

The information processing apparatus according to any one of (2) to (17), in which the generation unit generates the display control information on a basis of each of a plurality of pieces of the second operation information detected about a plurality of the second real objects.

(19)

An information processing method executed by a processor, including:

generating display control information for displaying a virtual space on a basis of first operation information detected about a first real object corresponding to a virtual object in the virtual space and second operation information detected about a second real object corresponding to a virtual tool in the virtual space.

(20)

A program causing a computer to function as:

a generation unit configured to generate display control information for displaying a virtual space on a basis of first operation information detected about a first real object corresponding to a virtual object in the virtual space and second operation information detected about a second real object corresponding to a virtual tool in the virtual space.

REFERENCE SIGNS LIST

1 information processing system
10 manipulator
11 origin
12 look-at point
13 direction
20 virtual object
100 information processing apparatus
110 sensor unit
120 display unit
130 communication unit
140 storage unit
150 control unit
151 obtaining unit
153 storage control unit
155 generation unit
157 display control unit
160 arm
170 projection surface
180 table
190 recognition range
200 pen for operation
210 button
220 light emitting unit
300 cube for operation
400 model object

The invention claimed is:

1. An information processing apparatus, comprising:
a processor configured to:
control reception of first operation information of a first real object that corresponds to a virtual object in a virtual space;
control reception of second operation information of a second real object that corresponds to a virtual tool in the virtual space, wherein
the second operation information is based on detection of light emitted by the second real object,
a position of the virtual tool in the virtual space corresponds to coordinates of the second real object in a real space,
the coordinates of the second real object in the real space are based on the light emitted by the second real object, and
the light emitted by the second real object is directed to a specific side of the first real object;
generate display control information for display of the virtual space on a display device, wherein the display control information is generated based on the first operation information and the second operation information; and
control the display device to change a direction from which the virtual object is viewed in the virtual space, wherein the direction is changed based on the specific side of the first real object to which the light is directed.

2. The information processing apparatus according to claim 1, wherein
the first operation information includes information indicating a position and a posture of the first real object, and
the second operation information includes information indicating a position, a posture, and a direction of the second real object.

3. The information processing apparatus according to claim 2, wherein the processor is further configured to projection map the first real object based on the display control information.

4. The information processing apparatus according to claim 3, wherein
the processor is further configured to control an image projected from a projector, and
the control of the image is based on a recognition result of a three-dimensional shape of the first real object and based on the display control information.

5. The information processing apparatus according to claim 3, wherein the processor is further configured to control, based on the display control information, image projection in accordance with a texture projection-mapped to the first real object.

6. The information processing apparatus according to claim 2, wherein the processor is further configured to generate the display control information indicating a parameter related to an operation of the virtual tool.

7. The information processing apparatus according to claim 6, wherein the processor is further configured to generate the display control information for display of the parameter at a place related to the second real object.

8. The information processing apparatus according to claim 2, wherein the processor is further configured to generate the display control information to indicate use of the virtual tool on the virtual object.

9. The information processing apparatus according to claim 8, wherein the virtual tool is a light source.

10. The information processing apparatus according to claim 9, wherein a parameter related to an operation of the virtual tool includes one of a type of light, color of light, intensity, a cone angle, an angle of a peripheral part, drop-off, color of shadow, or an effect.

11. The information processing apparatus according to claim 8, wherein the virtual tool is a camera.

12. The information processing apparatus according to claim 11, wherein a parameter related to an operation of the virtual tool includes one of a type of camera, an angle-of-view of camera, a focal length of camera, a depth-of-field of camera, zoom, or weight of camera.

13. The information processing apparatus according to claim 8, wherein the virtual tool is a particle emission device.

14. The information processing apparatus according to claim 13, wherein a parameter related to an operation of the virtual tool includes one of:
   a type of particle emission device, or
   one of shape, size, emission number, emission direction, emission angle, emission speed, emission rate, gravity, or viscosity of particles.

15. The information processing apparatus according to claim 2, wherein the processor is further configured to reflect a relationship in relative position and posture between the first real object and the second real object in relative position and posture between the virtual object and the virtual tool in the virtual space.

16. The information processing apparatus according to claim 2, wherein the processor is further configured to:
   reflect the position and the posture of the first real object in a position and a posture of the virtual object in the virtual space; and
   reflect the position and the posture of the second real object in the position and a posture of the virtual tool in the virtual space.

17. The information processing apparatus according to claim 2, wherein the processor is further configured to:
   control a storage unit to store information indicating a position and a posture of each of the virtual object and the virtual tool; and
   generate the display control information based on past information obtained from the storage unit.

18. The information processing apparatus according to claim 2, wherein the processor is further configured to generate the display control information based on each of a plurality of pieces of the second operation information of a plurality of second real objects.

19. An information processing method, comprising:
   controlling, by a processor, reception of first operation information of a first real object that corresponds to a virtual object in a virtual space;
   controlling, by the processor, reception of second operation information of a second real object that corresponds to a virtual tool in the virtual space, wherein
      the second operation information is based on detection of light emitted by the second real object,
      a position of the virtual tool in the virtual space corresponds to coordinates of the second real object in a real space,
      the coordinates of the second real object in the real space are based on the light emitted by the second real object, and
      the light emitted by the second real object is directed to a specific side of the first real object;
   generating, by the processor, display control information for displaying the virtual space on a display device, wherein the display control information is generated based on the first operation information and the second operation information; and
   controlling the display device to change a direction from which the virtual object is viewed in the virtual space, wherein the direction is changed based on the specific side of the first real object to which the light is directed.

20. A non-transitory computer-readable medium having stored thereon, computer-executable instructions, which when executed by a processor, cause the processor to execute operations, the operations comprising:
   controlling reception of first operation information of a first real object that corresponds to a virtual object in a virtual space;
   controlling reception of second operation information of a second real object that corresponds to a virtual tool in the virtual space, wherein
      the second operation information is based on detection of light emitted by the second real object,
      a position of the virtual tool in the virtual space corresponds to coordinates of the second real object in a real space,
      the coordinates of the second real object in the real space are based on the light emitted by the second real object, and
      the light emitted by the second real object is directed to a specific side of the first real object;
   generating display control information for displaying the virtual space on a display device, wherein the display control information is generated based on the first operation information and the second operation information; and
   controlling the display device to change a direction from which the virtual object is viewed in the virtual space, wherein the direction is changed based on the specific side of the first real object to which the light is directed.

* * * * *